(12) United States Patent
Murakami et al.

(10) Patent No.: US 7,075,989 B2
(45) Date of Patent: Jul. 11, 2006

(54) MOTION COMPENSATING APPARATUS, MOVING IMAGE CODING APPARATUS AND METHOD

(75) Inventors: Tokumichi Murakami, Tokyo (JP); Hideo Ohira, Tokyo (JP); Hirofumi Nishikawa, Tokyo (JP); Kenichi Asano, Tokyo (JP); Yoshihisa Yamada, Tokyo (JP); Shunichi Sekiguchi, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/837,704

(22) Filed: May 4, 2004

(65) Prior Publication Data

US 2004/0202245 A1    Oct. 14, 2004

Related U.S. Application Data

(62) Division of application No. 09/212,245, filed on Dec. 16, 1998, now abandoned.

(30) Foreign Application Priority Data

Dec. 25, 1997  (JP)  .................................. 9-357402
Jul. 22, 1998  (JP)  ................................ 10-206361

(51) Int. Cl.
   *H04N 7/12*    (2006.01)
(52) U.S. Cl. ............ 375/240.16; 375/240; 375/240.01; 375/240.12
(58) Field of Classification Search ................ 375/240, 375/240.01, 240.12, 240.16
   See application file for complete search history.

(56) References Cited

U.S. PATENT DOCUMENTS 5,374,959 A    12/1994  Sahakian (Continued)

FOREIGN PATENT DOCUMENTS

| EP | 0 520 765 A2 | 12/1992 |
| EP | 0 615 384 A2 | 9/1994 |
| JP | 8191449 | 7/1996 |

OTHER PUBLICATIONS

Development of MPEG2 Real Time Coding System Chip Set, Denshi Jouhou Tsuushin Gakkai Gijutsu Kenkyuu Houkoku, IEICE vol. 95, No. 217, pp. 2 - 8 (Aug. 24, 1995).

(Continued)

*Primary Examiner*—Allen Wong
(74) *Attorney, Agent, or Firm*—Birch, Stewart, Kolasch & Birch, LLP

(57) ABSTRACT

The present invention provides a motion compensating apparatus which is capable of enhancing the overall coding efficiency by taking the amount of coded information used to code a motion vector as well as the sum of difference absolute values of estimated differences into consideration in order to determine an optimal vector. The motion compensating apparatus includes: a motion compensation processing unit for outputting a motion vector between an input image and a reference image, and an estimated image which is extracted from the reference image in accordance with the motion vector; a unit for calculating the sum of difference absolute values, as a distortion amount calculating unit, to obtain a distortion amount between the input image and the estimated image; a vector value coding unit for receiving the motion vector to code the motion vector thus inputted thereto to output a vector coded amount; and an optimal vector determining unit for receiving the motion vector, the distortion amount and the vector coded amount to obtain, for all of a plurality of motion vectors to be evaluated, an evaluation function calculated from the distortion amount and the vector coded amount to output as an optimal vector the motion vector in which the evaluation function exhibits a minimum value.

2 Claims, 13 Drawing Sheets

U.S. PATENT DOCUMENTS

| | | |
|---|---|---|
| 5,387,937 A | 2/1995 | Dorricott et al. |
| 5,412,435 A | 5/1995 | Nakajima .................... 348/699 |
| 5,526,295 A | 6/1996 | Astle |
| 5,559,557 A | 9/1996 | Kato ...................... 375/240.03 |
| 5,604,546 A | 2/1997 | Iwata |
| 5,812,195 A * | 9/1998 | Zhang .................... 375/240.16 |
| 5,825,930 A | 10/1998 | Park et al. .................. 382/236 |
| 5,912,706 A | 6/1999 | Kikuchi et al. ........ 375/240.13 |

OTHER PUBLICATIONS

Fabuzi Kosentini, "Predictive RD Optimized Motion Estimation for Very Low Bit-Rate Video Coding", IEEE, 1997, pp. 1752-1763.

Pattabiraman Subramanian, et al., "Encoder Optimization in an Extended H.263 Framework", IEEE, 1998, pp. 209-213.

F. Bellifemine, et al., "Energy Reduction vs. Overheads Increasing: an Optimal Selection Criterion", IEEE 1991, US, vol. CONF. 16, pp. 385-390.

Bede Liu, et al. "New Fast Algorithms for the Estimation of Block Motion Vectors", IEEE Transactions on Circuits and Systems for Video Technology, vol. 3, No. 2, Apr. 1993, pp. 148-157.

Junavit Chalidabhongse, et al. "Fast Motion Vector Estimation Using Multiresolution-Spatio-Temporal Correlations", IEEE Systems for Video Technology, vol. 7, No. 3, Jun. 1997, pp. 477-488.

"Advanced Motion Estimation for Moving Picture Experts Group Encoders", IBM Technical Disclosure Bulletin, vol. 39, No. 04, Apr. 1996, p. 323.

Dzung T. Hoang et al., "Efficient Cost Measures for Motion Compensation at Low Bit Rates (extended abstract)," 1996 IEEE, Proceedings of the 1996 Data Compression Conference (DCC) vol. 068-0314/96, pp. 102-111.

* cited by examiner

MOTION COMPENSATING APPARATUS, MOVING IMAGE CODING APPARATUS AND METHOD

This application is a Divisional of application Ser. No. 09/212,245, filed on Dec. 16, 1998, now abandoned and for which priority is claimed under 35 U. S. C. § 120; and this application claims priority of Application No. 9-357402 filed in Japan on Dec. 25, 1997 and Application No. 10-206361 filed in Japan on Jul. 22, 1998 under 35 U. S. C. § 119; the entire contents of all are hereby incorporated by reference.

BACKGROUND OF THE INVENTION

1. Field of the Invention

The present invention relates to a motion compensating apparatus which is applied to a digital image transmitter, a digital CATV or a digital broadcasting system.

2. Description of the Related Art

FIG. 18 is a block diagram explaining a conventional digital image coding system which is shown in an article entitled "DEVELOPMENT OF MPEG2 REAL TIME CODING SYSTEM CHIP SET", Denshi Jouhou Tsuushin Gakkai Gijutsu Kenkyuu Houkoku, Vol. 95, No. 217, pp. 2 to 8 (1995).

In FIG. 18, reference numeral 400 denotes a motion compensation processing unit for receiving as inputs thereof an input image 202 and reference images 152 to output an estimated image 204 and an optimal vector 449; reference numeral 222 denotes a differential unit for obtaining a difference between the input image 202 and the estimated image 204 to output a residual signal 223; reference numeral 401 denotes a difference signal coding processing unit for coding the residual signal 223 inputted thereto to output difference coded data 450; and reference numeral 402 denotes a motion vector coding processing unit for coding the optimal vector 449 inputted thereto to output motion vector coded data 451.

Next, the operation of the conventional digital image coding system as configured above will hereinbelow be described.

The motion compensation processing unit 400 receives as the inputs thereof the input image 202 as the image of the current frame and the reference images 152 as the image of the former frames to retrieve the image which bears the closest resemblance to the input image 202 from the reference images 152.

The retrieval method is such that the sum of difference absolute values between the input image 202 and the reference images 152 and the image among the reference images which gives the most small distortion is made to be the optimal image, i.e., the estimated image 204. In this connection, as shown in FIG. 19, the motion vector exhibits how far the optimal image (the estimated image) moves spatially from the position of the input image in the current frame.

The motion vector is transmitted as the optimal vector 449 to the motion vector coding processing unit 402 which codes in turn the optimal vector 449 thus transmitted thereto to output the resultant information.

On the other hand, with respect to an estimated error signal which has been obtained after estimation by the motion compensation processing unit 400, the difference between the optimal estimated image 204 which has been selected by the motion compensation processing unit 400 and the input image 202 is obtained by the differential unit 222 and the residual signal 223 is coded by the difference signal coding processing unit 401 to be outputted.

The amount of generated information in the coding processing of this processing is the value which is obtained by summing the information amount of the difference coded data 450 which is generated in the difference signal coding processing unit 401 and the information amount of the motion vector coded data 451 which is generated in the motion vector coding processing unit 402.

In the conventional apparatus, as described above, the vector exhibiting the minimum value of the sum of difference absolute values is selected as the optimal vector in the motion compensation processing unit 400.

In the image coding processing, however, the vector which has been selected as the optimal vector in the motion compensation is coded (motion vector coding) and at the same time, the residual (the estimated error) between the current block and the former block of the optimal vector position is coded (residual coding).

Then, the information which is obtained by summing the information amount obtained by the motion vector coding and the information amount obtained by the residual coding becomes the amount of coded information.

For this reason, for example, in the case where the information amount becomes very large after completion of the coding of the optimal vector, or the like, the optimal vector which is selected by the above-mentioned method does not always minimize the amount of coded information.

In addition, while in general, the vector is obtained in the motion compensating estimation using only the luminance information, for the images in which the luminance signals are identical to each other but the color difference signals are different from each other, the wrong motion vector is extracted.

SUMMARY OF THE INVENTION

In the light of the foregoing, the present invention was made in order to solve the above-mentioned problems associated with the prior art, and it is therefore an object of the present invention to provide a motion compensating apparatus which is capable of enhancing the overall coding efficiency by taking into consideration the amount of coded information for coding the motion vector as well as the sum of difference absolute values of the estimated differences in order to determine an optimal vector.

A motion compensating apparatus according to one aspect of the present invention includes: motion compensation processing means for receiving as inputs thereof an input image and a reference image to output a motion vector between the input image and the reference image, and an estimated image which is extracted from the reference image in accordance with the motion vector; distortion amount calculating means for receiving as inputs thereof the input image and the estimated image to obtain a distortion amount between the input image and the estimated image; vector value coding means for receiving as an input thereof the motion vector to code the motion vector thus inputted thereto to output a vector coded amount; and optimal vector determining means for receiving as inputs thereof the motion vector, the distortion amount and the vector coded amount to obtain, for all of a plurality of motion vectors to be evaluated, an evaluation function which is calculated from the distortion amount and the vector coded amount to output as an optimal vector the motion vector in which the evaluation function exhibits a minimum value.

In addition, the distortion amount calculating means is characterized by comprising a unit for calculating the sum of difference absolute values which unit serves to calculate the sum of difference absolute values between the input image and the estimated images to output the sum of difference absolute value thus calculated.

In addition, the distortion amount calculating means is characterized by comprising a unit for calculating the sum of squares of differences which unit serves to calculate the sum of squares of differences between the input image and the estimated images to output the sum of squares of differences thus calculated.

Further, the vector value coding means is characterized by including: a delay unit for delaying the motion vector inputted thereto; a differential unit for obtaining a difference between the motion vector inputted thereto and the motion vector delayed through the delay unit to output a difference vector; and a difference vector coding unit for coding the difference vector to output a vector coded amount.

In addition, a motion compensating unit according to another aspect of the present invention includes: motion compensation processing means for receiving as inputs thereof an input image and a reference image to output a motion vector between the input image and the reference image, and an estimated image which is extracted from the reference image in accordance with the motion vector; first mean value separating means for obtaining a mean value separated input image which is obtained by separating a mean value from the input image; second mean value separating means for obtaining a mean value separated estimated image which is obtained by separating a mean value from the estimated image; distortion amount calculating means for receiving as inputs thereof the mean value separated input image and the mean value separated estimated image to obtain an evaluation value by calculation of a distortion amount between the mean value separated input image and the mean value separated estimated image; and optimal vector determining means for receiving as inputs thereof the motion vector and the evaluation value to obtain, for all of a plurality of motion vectors to be evaluated, the evaluation value to output as an optimal vector the motion vector in which the evaluation value exhibits a minimum value.

In addition, the distortion amount calculating means is characterized by comprising a unit for calculating the sum of difference absolute values which unit serves to calculate the sum of difference absolute values between the mean value separated input image and the mean value separated estimated image to output the sum of difference absolute values thus calculated.

In addition, the distortion amount calculating means is characterized by comprising a unit for calculating the sum of squares of differences which unit serves to calculate the sum of squares of differences between the mean value separated input image and the mean value separated estimated image to output the sum of squares of differences thus calculated.

Also, the motion compensating apparatus according to another aspect of the present invention further includes vector value coding means for receiving as an input thereof the motion vector to code the motion vector thus inputted thereto to output a vector coded amount, and is characterized in that the optimal vector determining means receives as inputs thereof the motion vector, the distortion amount and the vector coded amount to obtain, for all of a plurality of motion vectors to be evaluated, an evaluation function which is calculated on the basis of the distortion amount and the vector coded amount to output as the optimal vector the motion vector in which the evaluation function exhibits a minimum value.

In addition, a motion compensating apparatus according to still another aspect of the present invention includes: motion compensation processing means for receiving as inputs thereof an input image and a reference image to output a motion vector between the input image and the reference image, and an estimated image which is extracted from the reference image in accordance with the motion vector; a subtracter for subtracting the input image and the estimated image from each other to obtain an estimated error; frequency analyzing means for converting the estimated error to a frequency coefficient; evaluation value producing means for producing an evaluation value on the basis of the frequency coefficient obtained by the conversion; and vector determining means for receiving as inputs thereof the motion vector and the evaluation value to output as an optimal vector the motion vector, in which the evaluation value exhibits a minimum value, out of a plurality of motion vectors which can be selected.

In addition, a motion compensating apparatus according to yet another aspect of the present invention includes: motion compensation processing means for receiving as inputs thereof an input image and a reference image to output a motion vector between the input image and the reference image, and an estimated image which is extracted from the reference image in accordance with the motion vector; a subtracter for subtracting the input image and the estimated image from each other to obtain an estimated error; difference image coding means for subjecting the estimated error to the difference coding to output a difference image coded amount; vector value coding means for receiving as an input thereof the motion vector to code the motion vector thus inputted thereto to output a vector coded amount; and vector determining means for receiving as inputs thereof the motion vector, the difference image coded amount and the vector coded amount to output as an optimal vector the motion vector, in which a coded amount obtained by adding the vector coded amount to the difference image coded amount is minimum, out of a plurality of motion vectors which can be selected.

In addition, a motion compensating apparatus according to yet another aspect of the present invention includes: motion compensation processing means for receiving as inputs thereof an input image and a reference image to output a motion vector between the input image and the reference image, and an estimated image which is extracted in accordance with the reference image; first luminance/color difference separating means for separating an input image luminance signal and an input image color difference signal from the input image; second luminance/color difference separating means for separating an estimated image luminance signal and an estimated image color difference signal from the estimated image; a first subtracter for obtaining a difference between the input image color difference signal from the first luminance/color difference separating means and the estimated image color difference signal from the second luminance/color difference separating means; a second subtracter for obtaining a difference between the input image luminance signal from the first luminance/color difference separating means and the estimated image luminance signal from the second luminance/color difference separating means; color difference evaluation value producing means for producing a color difference evaluation value on the basis of the output from the first subtracter; luminance evaluation value producing means for producing a luminance evaluation value on the basis of the output from the second subtracter; evaluation value calculating means for calculating an evaluation value for determination of an optimal vector on the basis of the color difference evaluation value from the color difference value producing means and the luminance evaluation value from the luminance evaluation value producing means; and vector determining means for receiving as inputs thereof the motion vector and the evaluation value for determination of an optimal vector to output as the optimal vector the motion vector, in which the evaluation value for determination of an optimal vector is minimum, out of a plurality of motion vectors which can be selected.

In addition, it is characterized in that the evaluation value calculating means is comprised of an adder for adding the color difference evaluation value from the color difference evaluation value producing means and the luminance evaluation value from the luminance evaluation value producing means to each other to obtain a total evaluation value, and the vector determining means receives as inputs thereof the motion vector and a total addition value as the total evaluation value to output as an optimal vector the motion vector, in which the total evaluation value is minimum, out of a plurality of motion vectors which can be selected.

In addition, a motion compensating apparatus according to yet another aspect of the present invention includes: motion compensation processing means for receiving as inputs thereof an input image and a reference image to output a motion vector between the input image and the reference image, and also for a luminance component of the input image, to output both of an estimated image luminance signal which is extracted from the reference image in accordance with a motion vector luminance signal and an estimated image color difference signal which is extracted therefrom in accordance with a motion vector color difference signal; first luminance/color difference separating means for separating an input image luminance signal and an input image color difference signal from the input image; third luminance/color difference separating means for separating the motion vector luminance signal and the motion vector color difference signal from the motion vector; a first subtracter for obtaining a difference between the input image color difference signal from the first luminance/color difference separating means and the estimated image color difference signal; a second subtracter for obtaining a difference between the input image luminance signal from the first luminance/color difference separating means and the estimated image luminance signal; color difference evaluation value producing means for producing a color difference evaluation value on the basis of the output from the first subtracter; luminance evaluation value producing means for producing a luminance evaluation value on the basis of the output from the second subtracter; luminance/color difference evaluation value comparing means for comparing the color difference evaluation value from the color difference evaluation value producing means with the luminance evaluation value from the luminance evaluation value producing means to output an evaluation value comparison difference; and vector determining means for receiving as inputs thereof the motion vector luminance signal, the motion vector color difference signal and the evaluation value comparison difference to output as an optimal vector the motion vector, in which the evaluation value comparison difference is minimum, out of a plurality of motion vectors which can be selected.

In addition, a motion compensating apparatus according to yet another aspect of the present invention, for estimating, when carrying out the moving picture coding, a motion from data of former frames for every block to carry out reduction of information amount, includes: former frame memory means for storing therein data of the former frames; minimum distortion calculating means for subjecting specific regions of a current block and the former frames to the pattern matching to calculate a motion vector giving a minimum distortion and a distortion value; specific vector distortion calculating means for calculating distortions between the current block and the blocks of the former frames corresponding to one or more input motion vectors; and optimal vector outputting means for outputting an optimal motion vector on the basis of the distortion which is outputted from the minimum distortion calculating means and the distortions which are outputted from the specific vector distortion calculating means.

In addition, it is characterized in that the motion vector which is to be inputted to the specific vector distortion calculating means is obtained by inputting the vector which has been outputted from the optimal vector outputting means.

In addition, the optimal vector outputting means is characterized by including: an adder for weighting the distortion from the minimum distortion calculating means; a comparator for comparing the weighted distortion from the minimum distortion calculating means and the distortions from the specific vector distortion calculating unit with each other; and a selector for selecting one of the motion vector giving the minimum distortion and the specific vector on the basis of the comparison results provided by the comparator to output as the optimal motion vector the vector thus selected.

In addition, the optimal vector outputting means is characterized by further including an offset value calculating unit for changing adaptably an offset value of the weighting, which is to be added to the distortion from the minimum distortion calculating means, in accordance with the magnitude of the difference between the motion vector giving the minimum distortion and the specific vector to supply the offset value thus changed.

In addition, the minimum distortion calculating means is characterized by outputting a minimum distortion within a current search range, and a minimum distortion within a range which is previously set within a narrower range than the current search range.

Also, a moving image coding apparatus according to the present invention is based on motion compensation estimations and includes: a memory for storing reference image data used for a motion compensation estimation; motion detecting means for detecting a motion vector that gives a minimum estimated error based on an input macroblock and the reference image data from the memory; estimated vector derivation means for deriving an estimated vector used for coding the motion vector that is utilized for the motion compensation estimation of the input macroblock; motion compensating means for extracting, as estimated images corresponding to the motion vector, image data located at a position corresponding to the reference image data in the memory based on the given motion vector; threshold processing means for calculating an estimated error amount using the estimated image outputted from the motion compensating means based on the motion vector obtained from the motion detecting means, making a threshold determination on the estimated error amount using a first threshold, and not only outputting to the motion compensating means the estimated vector obtained from the estimated vector derivation means when the estimated error amount is greater than the first threshold but also outputting to the motion compensating means the motion vector obtained from the motion detecting means when the estimated error amount is smaller than the first threshold as a result of the determination; and estimated image determining means for generating an estimated error signal based on the estimated image corresponding to the estimated vector, making a threshold determination on an assumed value of codes generated for the estimated error signal using a second threshold, and not only outputting the motion vector obtained from the motion detecting means as a final motion vector when the assumed value of codes generated for the estimated error signal is greater than the second threshold and outputting the estimated vector as the final motion vector when the assumed value of codes generated for the estimated error signal is smaller than the second threshold as a result of the determination, but also outputting an estimated image corresponding to the final motion vector as a final estimated image.

In addition, the moving image coding apparatus further includes frame activity calculating means for calculating a frame activity value based on the motion vector and a minimum estimated error amount inputted from the motion detecting means, and effecting switching control of an estimated vector-using motion vector replacement process performed by the threshold processing means and the estimated image determining means, the switching control being effected for every frame based on the calculated value.

Further, a moving image coding method according to the present invention is based on motion compensation estimations and includes: a motion vector detection step in which a motion vector that gives a minimum estimated error is detected based on an input macroblock and reference image data; a first threshold determination step in which a threshold determination is made on an estimated error signal based on the input macroblock and an estimated image corresponding to the motion vector, using a first threshold; an estimated vector derivation step in which an estimated vector used for coding the motion vector is derived when the estimated error signal is greater than the first threshold as a result of the first threshold determination; an estimated error signal generation step in which the estimated error signal based on an estimated image corresponding to the estimated vector is generated; a calculation step in which an assumed value of codes generated for the estimated error signal is calculated; a second threshold determination step in which a threshold determination is made on the calculated assumed value of codes generated for the estimated error signal using a second threshold; a replacement step in which the motion vector is replaced with the estimated vector when the assumed value of codes generated for the estimated error signal is smaller than the second threshold as a result of the second threshold determination; and the moving image coding method implements motion estimation coding using the motion vector.

Furthermore, the moving image coding method further includes a control step in which a frame activity value is calculated based on the motion vector and a minimum estimated error amount, and in which switching control over whether or not the motion vector is replaced with the estimated vector is effected for every frame based on the calculated value.

BRIEF DESCRIPTION OF THE DRAWINGS

The above and other objects as well as advantages of the present invention will become clear by the following description of the preferred embodiments of the present invention with reference to the accompanying drawings, wherein.

DETAILED DESCRIPTION OF THE PREFERRED EMBODIMENTS

The preferred embodiments of the present invention will hereinafter be described in detail with reference to the accompanying drawings.

First Embodiment

Figure 1:
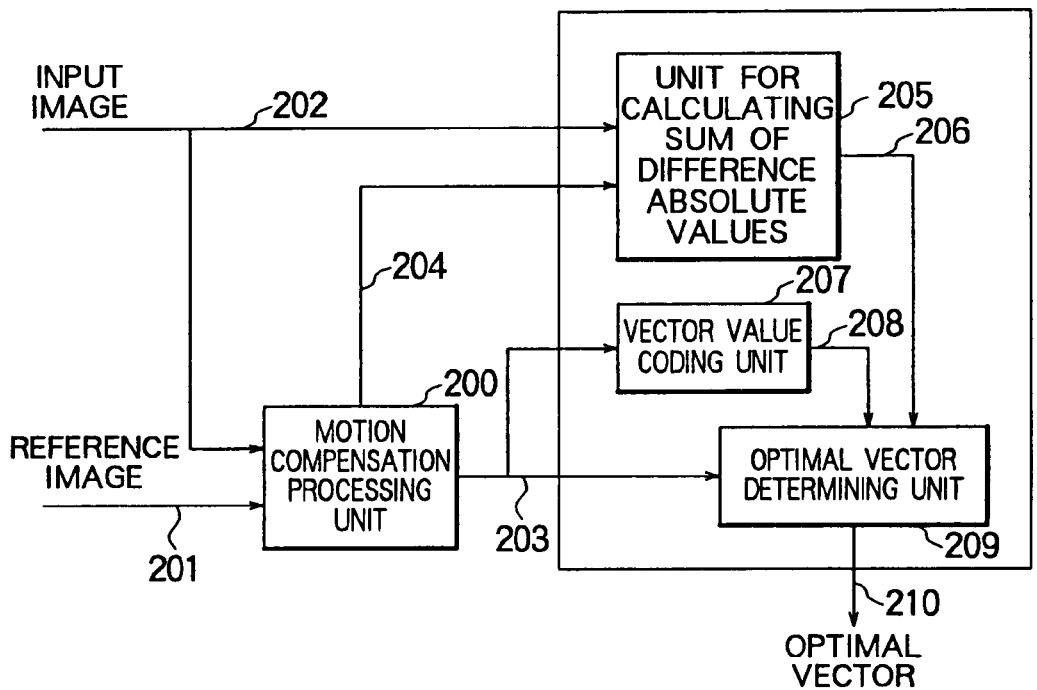
FIG. 1 is a block diagram showing a configuration of a motion compensating apparatus according to a first embodiment of the present invention.

FIG. 1 is a block diagram showing a configuration of a motion compensating apparatus according to a first embodiment of the present invention.

As shown in FIG. 1, a motion compensating apparatus according to the first embodiment includes: a motion compensation processing unit 200 for receiving as inputs thereof an input image 202 as an image of a current frame and reference images 201 as images of former frames to retrieve an image block, which bears the closest resemblance to the input image 202, from the reference images 201 to output a motion vector 203 between the input image 202 which is used to extract an estimated image according to the motion vector and the reference image 201, and the estimated image 204; a unit 205 for calculating the sum of difference absolute values as a distortion amount calculating unit which serves to calculate the sum of difference absolute values 206 as a distortion amount between the input image 202 and the estimated image 204 to output the sum of difference absolute values 206 thus calculated; a vector value coding unit 207 for receiving as an input thereof the motion vector 203 to code the motion vector 203 thus inputted thereto to output a vector coded amount 208; and an optimal vector determining unit 209 for receiving as inputs thereof the motion vector 203, the sum of difference absolute values 206 and the vector coded amount 208 to obtain for all of a plurality of motion vectors 203 to be evaluated, an evaluation function which is calculated on the basis of the sum of difference absolute values 206 and the vector coded amount 208 to output as an optimal vector 210 the motion vector in which the evaluation function exhibits a minimum value.

Next, the description will hereinbelow be given with respect to the operation of the motion compensating apparatus thus configured according to the first embodiment of the present invention.

The motion compensation processing unit 200 extracts, for the input image 202, the estimated image 204 from the reference images 201 in accordance with the motion vector 203. In the unit 205 for calculating the sum of difference absolute values, the sum of difference absolute values 206 is calculated on the basis of the input image 202 and the estimated image 204.

On the other hand, the motion vector 203 which is used to extract the estimated image 204 is inputted to both of the vector value coding unit 207 and the optimal vector determining unit 209. The motion vector 203 which has been inputted to the vector value coding unit 207 is coded and then the vector value coding unit 207 outputs the vector coded amount 208. In this connection, in the vector value coding unit 207, the variable-length coding or the like is employed in many cases.

The sum of difference absolute values 206, the vector coded amount 208 and the motion vector 203 are inputted to the optimal vector determining unit 209 which computes in turn, with respect to all of a plurality of motion vectors to be evaluated, the evaluation function which is calculated on the basis of the sum of difference absolute values 206 and the vector coded amount 208 to output as the optimal vector 210 the motion vector in which the value of the evaluation function exhibits the minimum value. In this connection, as for the used evaluation function, for example, the function is employed in which the sum of difference absolute values 206 and the vector coded amount 208 is subjected to the weighting addition.

In such a way, for the determination of the optimal vector 210, not only the sum of difference absolute values 206 is used, but also the vector coded amount 208 is used together therewith, which results in the overall coding efficiency being able to be enhanced. In particular, since in the low rate coding, the vector coded amount occupies half or more the total amount of coded information, the selection of the motion vector is important in which the vector coded amount is taken into consideration.

That is, in order to code the motion vector, the amount of coded information, and the information amount used to code an estimated error signal are used as the evaluated value to select the optimal vector, whereby the final results of coding become more efficient as compared with the conventional motion compensating estimation.

Second Embodiment

Figure 2:
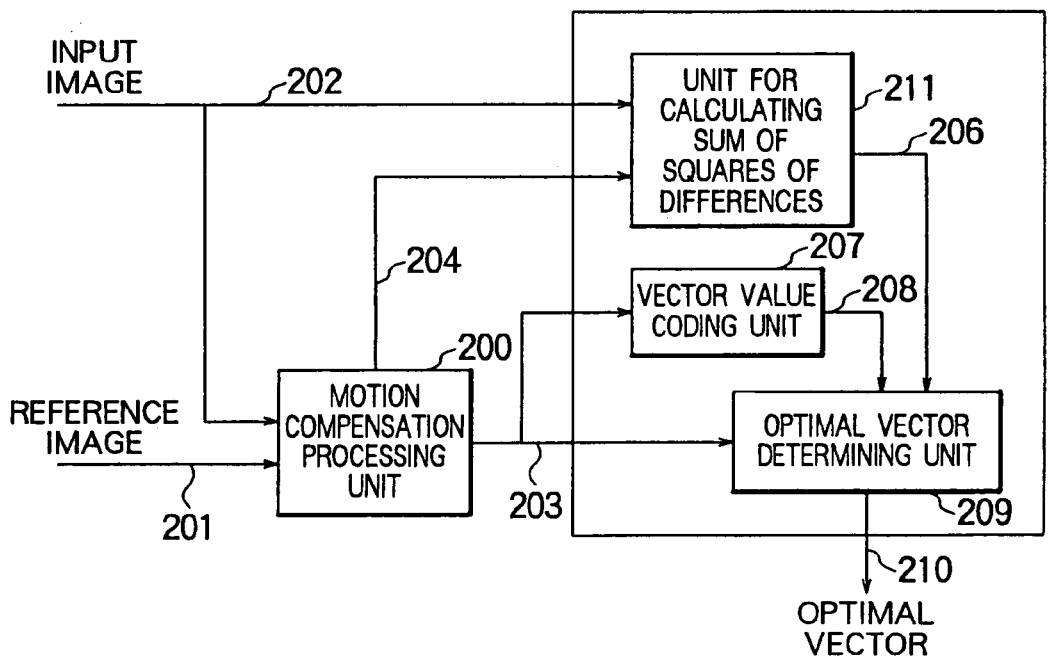
FIG. 2 is a block diagram showing a configuration of a motion compensating apparatus according to a second embodiment of the present invention.

FIG. 2 is a block diagram showing a configuration of a motion compensating apparatus according to a second embodiment of the present invention.

In FIG. 2, portions identical to those in the first embodiment previously described with reference to FIG. 1 are denoted by the same reference numerals, and the description thereof is omitted here for the sake of simplicity. As for a new reference numeral, reference numeral 211 denotes a unit for calculating the sum of squares of differences which is employed instead of the unit 205 for calculating the sum of difference absolute values used as the distortion amount calculating unit shown in FIG. 1.

The calculation of the square is carried out for the sum of squares of differences and hence the more complicated calculation is necessarily required as compared with the calculation of the sum of difference absolute values. In this case, however, it is possible to evaluate the power contained in the signal. In general, if the power is employed, then the estimated error signal can be evaluated more accurately. For this reason, the estimation is carried out more accurately as compared with that in the first embodiment, and hence the optimal vector can be obtained more exactly.

Third Embodiment

Figure 3:
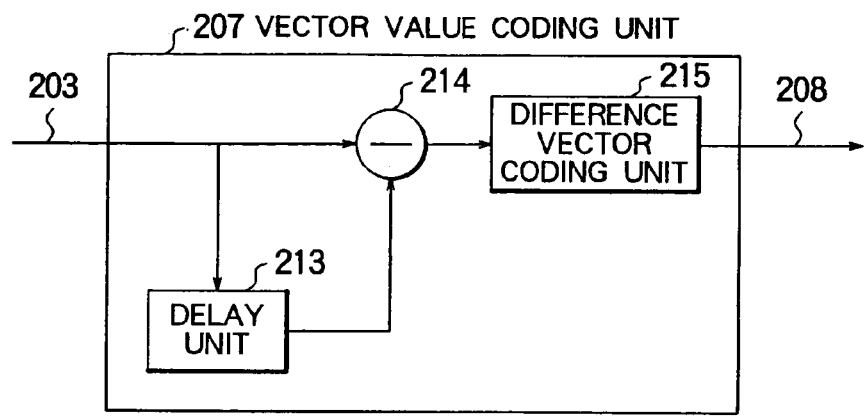
FIG. 3 is a block diagram showing a configuration of a motion compensating apparatus according to a third embodiment of the present invention.

FIG. 3 is a block diagram explaining a configuration of a motion compensating apparatus according to a third embodiment of the present invention, and in more detail, it is an internal configuration of the vector value coding unit 207 shown in the above-mentioned first and second embodiments.

As shown in FIG. 3, the vector value coding unit 207 includes: a delay unit 213 for delaying the motion vector 203 inputted thereto; a differential unit 214 for obtaining a difference between the motion vector inputted thereto and the motion vector delayed through the delay unit 213 to output a difference vector; and a difference vector coding unit 215 for coding the difference vector to output the motion vector coded amount 208.

As to the motion vector 203 which has been inputted to the vector value coding unit 207, the difference between the motion vector 203 of interest and the motion vector which is previously inputted and temporarily accumulated in the delay unit 213 is obtained in the difference unit 214, and then the resultant difference vector is coded in the difference vector coding unit 215. The motion vectors take the like values when viewing locally the screen in many cases.

Therefore, if the differences between the motion vector 203 of interest and the motion vectors in the vicinity of the location on the screen of the already used motion vector are obtained, then the values to be coded can be reduced, and also the vector value coded amount can be reduced to enhance the coding efficiency.

Fourth Embodiment

Figure 4:
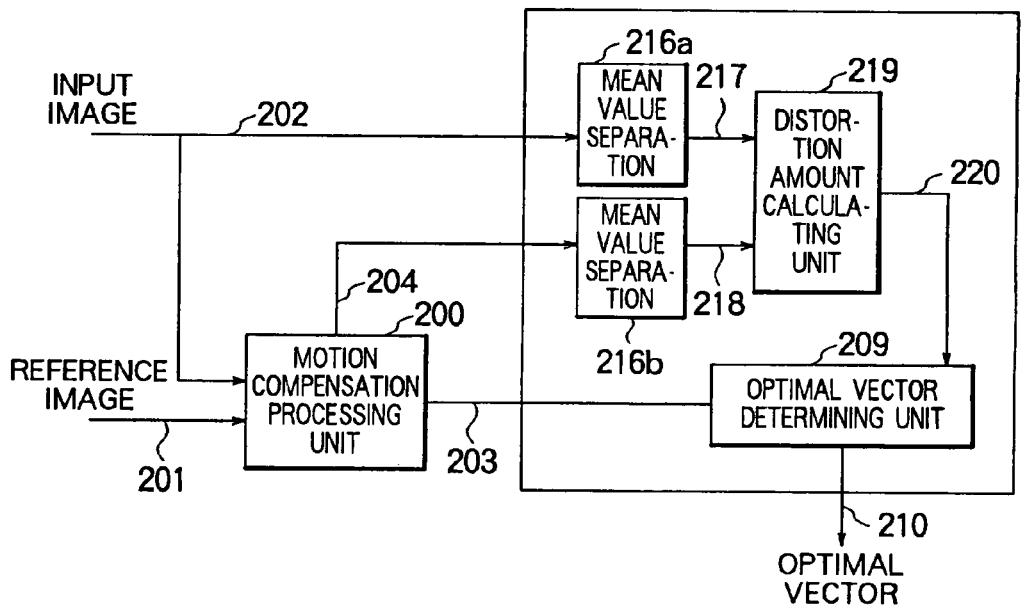
FIG. 4 is a block diagram showing a configuration of a motion compensating apparatus according to a fourth embodiment of the present invention.

FIG. 4 is a block diagram showing a configuration of a motion compensating apparatus according to a fourth embodiment of the present invention.

In FIG. 4, portions identical to those in the first embodiment previously described with reference to FIG. 1 are denoted by the same reference numerals, and the description thereof is omitted here for the sake of simplicity. As for new reference numerals, reference numeral 216*a* denotes a first mean value separating unit for obtaining a mean value separated input image 217 which is obtained by separating a mean value from the input image 202, reference numeral 216*b* denotes a second mean value separating unit for obtaining a mean value separated estimated image 218 which is obtained by separating a mean value from the estimated image 204; and reference numeral 219 denotes a distortion amount calculating unit for receiving as inputs thereof the mean value separated input image 217 and the mean value separated estimated image 218 to obtain a distortion amount between the mean value separated input image 217 and the mean value separated estimated image 218.

In this connection, the distortion amount calculating unit 219 obtains, similarly to the above-mentioned first and second embodiments, an evaluation value 220 which is obtained on the basis of the calculation of the sum of difference absolute values or the sum of squares of differences to input the estimated value 220 thus obtained to the optimal vector determining unit 209.

In addition, the optimal vector determining unit 209 receives as inputs thereof the motion vector 203 and the evaluation value 220 which has been obtained on the basis of the calculation of the sum of difference absolute values or the sum of squares of differences to obtain for all of a plurality of motion vectors 203 to be evaluated, the evaluation value 220 to output as the optimal vector 210 the motion vector in which the evaluation value exhibits the minimum value.

As shown in FIG. 4, the mean values are separated from the input image 202 and the estimated image 204 in the mean value separating units 216*a* and 216*b*, respectively. The evaluation value 220 is obtained on the basis of the calculation of the sum of difference absolute values or the sum of squares of differences, as previously described with reference to FIGS. 1 and 2, between the mean value separated input image 217 which has been obtained by separating the mean value from the input image 202 and the mean value separated estimated image 218 which has been obtained by separating the mean value from the estimated image 204.

Then, the evaluation value 220 thus obtained is inputted to the optimal vector determining unit 209 to obtain the optimal vector 210.

In such a way, carrying out the evaluation with the mean values separated from the respective images means that the motion compensation can be carried out irrespective of any of levels of the image. For example, in the case of the fade-in image, the image in which the luminance varies frequently, or the like, while the accurate motion can not be detected by the conventional motion search, by separating the mean values from the respective images, the motion vector can be detected more accurately in such cases as well.

That is, the motion estimation evaluation is carried out among the images which are obtained by separating the mean values from the input image and the estimated image, respectively, whereby the motion compensation can be carried out irrespective of any levels of the image, and also even for the image which varies violently, the motion vector can be detected more accurately.

Incidentally, while not described here, it is to be understood that as described with reference to FIGS. 1 and 2, the motion vector coded amount 208 can be used as other evaluation value to be made useful to determine the optimal vector. In addition, likewise, as described with reference to FIG. 3, it is also effective to carry out the difference vector coding as the vector coding.

Fifth Embodiment

Figure 5:
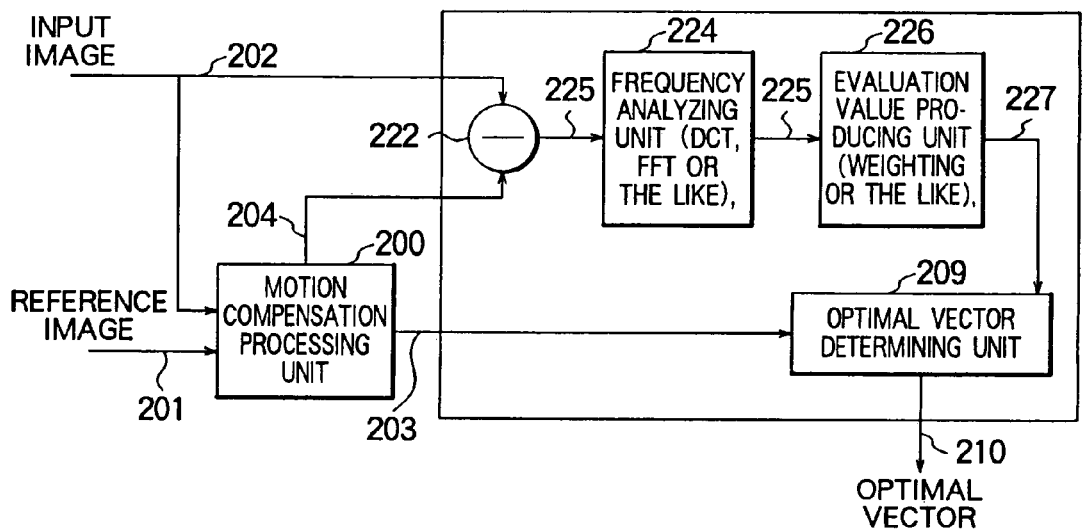
FIG. 5 is a block diagram showing a configuration of a motion compensating apparatus according to a fifth embodiment of the present invention.

FIG. 5 is a block diagram showing a configuration of a motion compensating apparatus according to a fifth embodiment of the present invention.

In FIG. 5, portions identical to those in the first embodiment previously described with reference to FIG. 1 are denoted by the same reference numerals, and the description thereof is omitted here for the sake of simplicity. As for new reference numerals, reference numeral 222 denotes a subtracter for subtracting the input image 202 and the estimated image 204 from each other to obtain an estimated error 223, reference numeral 224 denotes a frequency analyzing unit, such as a DCT or an FFT, for converting the estimated error 223 into a frequency coefficient 225; and reference numeral 226 denotes an evaluation value producing unit for carrying out the weighting and the like on the basis of the frequency coefficient 225, which has been obtained on the basis of the conversion by the frequency analyzing unit 224, to produce an evaluation value 227.

The optimal vector determining unit 209 receives as inputs thereof the motion vector 203 and the evaluation value 227 to output as the optimal vector 210 the motion vector, in which the evaluation value 227 exhibits a minimum value, out of a plurality of motion vectors which can be selected.

As shown in FIG. 5, the subtracter 222 receives as inputs thereof the input image 202 and the estimated image 204 to output the estimated error 223 which is in turn converted into the frequency coefficient 225 in the frequency analyzing unit 224. Then, the frequency coefficient 225 which has been obtained by the conversion is subjected to the evaluation calculation in the evaluation value producing unit 226 to be outputted in the form of the evaluation value 227.

In such a way, carrying out the frequency analysis of the estimated error to obtain the frequency coefficient corresponds substantially the processing which is executed when subjecting the estimated error to the conversion coding. For example, the low frequency component of the resultant frequency coefficient is weighted to produce the evaluation value, whereby the amount of coded information when subjecting the estimated error to the conversion coding can be estimated with considerable accuracy. By using the amount of coded information as the evaluation value, it can be expected that the coding be carried out more efficiently.

That is, the estimated difference is frequency-analyzed to obtain the frequency coefficient on the basis of which the evaluation value is in turn obtained, whereby the amount of coded information after completion of the conversion coding including the coding of the estimated error can be estimated with considerable accuracy and hence the coding can be carried out with high efficiency.

Sixth Embodiment

Figure 6:
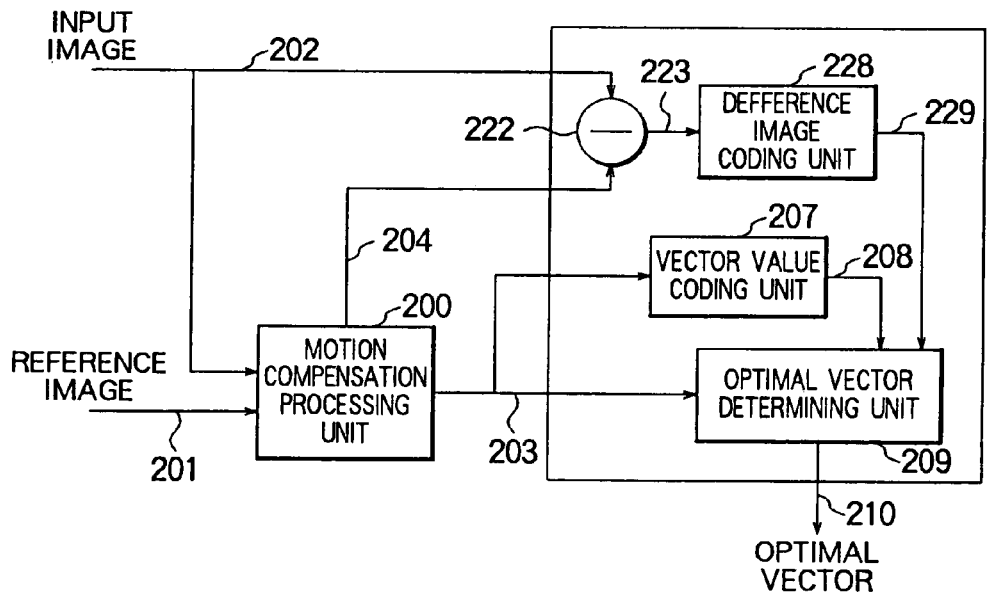
FIG. 6 is a block diagram showing a configuration of a motion compensating apparatus according to a sixth embodiment of the present invention.

FIG. 6 is a block diagram showing a configuration of a motion compensating apparatus according to a sixth embodiment of the present invention.

In FIG. 6, portions identical to those in the first and fifth embodiment previously described with reference to FIGS. 1 and 5 are denoted by the same reference numerals, and the description thereof is omitted here for the sake of simplicity. As for a new reference numeral, reference numeral 228 denotes a difference image coding unit for difference-coding the estimated error 223 from the subtracter 222 to output a difference image coded amount 229.

The optimal vector determining unit 209 receives as inputs thereof the motion vector 203, the difference image coded amount 229, and the vector coded amount 208 from the vector value coding unit 207 to output as the optimal vector 210 the motion vector, in which the amount of coded information obtained by adding the vector coded amount 208 to the difference image coded amount 229 exhibits a minimum value, out of a plurality of motion vectors 203 which can be selected.

As shown in FIG. 6, the subtracter 222 receives as inputs thereof the input image 202 and the estimated image 204 to output the estimated error 223 which is in turn coded in the difference image coding unit 228 to be outputted in the form of the difference image coded amount 229. Difference-coding the estimated error corresponds substantially to the normal coding processing.

Further, by adding the vector coded amount 208 to the difference image coded amount 229, it is possible to calculate the nearly perfect coded amount when employing the motion vector 203. Therefore, by adopting the present configuration, it is possible to obtain the vector, in which the amount of coded information is most optimal, out of all of a plurality of motion vectors which can be selected.

That is, the estimated error is coded to obtain the amount of coded information, and also the vector coded amount is employed which is obtained after completion of the vector coding, whereby it is possible to obtain the nearly perfect coded amount in the vector of interest and also the optimal coding can be carried out in relation between the distortion and the amount of coded information.

Seventh Embodiment

Figure 7:
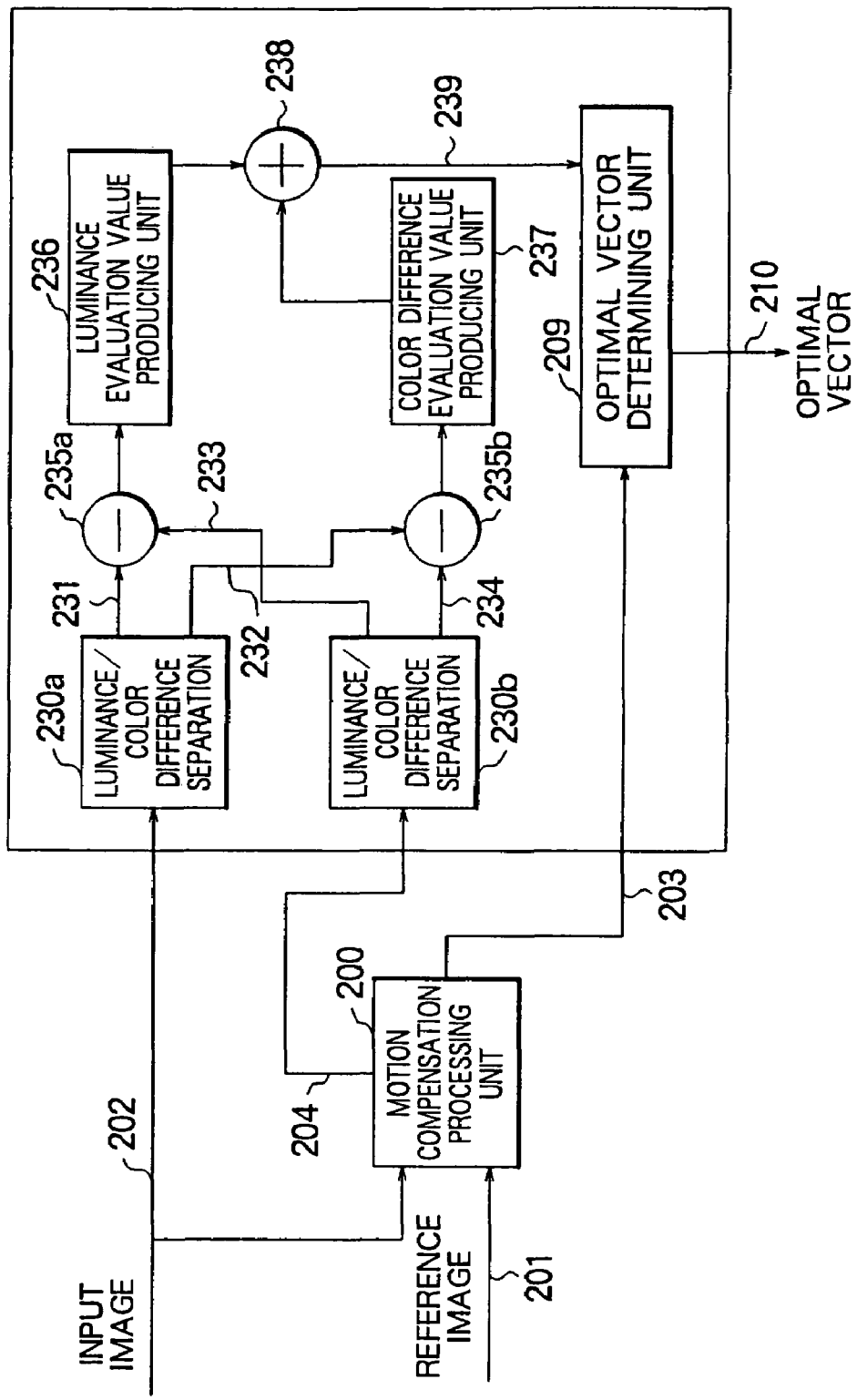
FIG. 7 is a block diagram showing a configuration of a motion compensating apparatus according to a seventh embodiment of the present invention.

FIG. 7 is a block diagram showing a configuration of a motion compensating apparatus according to a seventh embodiment of the present invention.

In FIG. 7, portions identical to those in the first embodiment shown in FIG. 1 are denoted by the same reference numerals, and the description thereof is omitted here for the sake of simplicity. As for new reference numerals, reference numeral 230a denotes a first luminance/color difference separating unit for separating an input image luminance signal 231 and an input image color difference signal 232 from the input image 202; reference numeral 230b denotes a second luminance/color difference separating unit for separating an estimated image luminance signal 233 and an estimated image color difference signal 234 from the estimated image 204; reference numeral 235a denotes a second subtracter for obtaining a difference between the input image luminance signal 231 from the first luminance/color difference separating unit 230a and the estimated image luminance signal 233 from the second luminance/color difference separating unit 230b; reference numeral 235b denotes a first subtracter for obtaining a difference between the input image color difference signal 232 from the first luminance/color difference separating unit 230a and the estimated image color difference signal 234 from the second luminance/color difference separating unit 230b; reference numeral 237 denotes a color difference evaluation value producing unit for producing a color difference evaluation value on the basis of the output from the first subtracter 235b; reference numeral 236 denotes a luminance evaluation value producing unit for producing a luminance evaluation value on the basis of the output from the second subtracter 235a; and reference numeral 238 denotes an adder, as an evaluation value calculating unit, for calculating a total evaluation value 239 for determination of the optimal vector on the basis of the color difference evaluation value from the color difference evaluation value producing unit 237 and the luminance evaluation value from the luminance evaluation value producing unit 236.

The optimal vector determining unit 209 receives as inputs thereof the motion vector 203 and the total evaluation value 239 for determination of the optimal vector to output as the optimal vector 210 the motion vector, in which the total evaluation value for determination of the optimal vector is minimum, out of a plurality of motion vectors which can be selected.

As shown in FIG. 7, the input image 202 and the estimated image 204 are inputted to the luminance/color difference separating units 230a and 230b to be separated into the input image luminance signal 231 and the input image color difference signal 232, and the estimated image luminance signal 233 and the estimated image color difference signal 234, respectively.

For the signals obtained by the separation, the difference between the luminance signals and the difference between the color difference signals are obtained in the subtracters 235a and 235b and then are independently inputted to the luminance evaluation value producing unit 236 and the color difference evaluation value producing unit 237 in which the evaluation values are in turn calculated, respectively.

The luminance evaluation value and the color difference evaluation value which have been thus calculated are added to each other in the adder 238 to obtain the total evaluation value 239. In accordance with the overall evaluation value 239, out of a plurality of motion vectors which can be selected, the motion vector in which the total evaluation value is minimum becomes the optimal vector 210.

In the conventional motion compensating estimation, in general, the evaluation value is calculated on the basis of only the luminance component. Obtaining the evaluation value on the basis of separation of the luminance and the color difference means that the motion which can not be obtained on the basis of only the luminance can be obtained by employing the color difference image. When carrying out the separation of the luminance component and the color difference component, there is present the image in which though there is no change with the luminance signal, the change is clearly present with the color difference component.

In the case of such an image, if the motion compensation is carried out on the basis of only the luminance component, then it is impossible to follow the change in the color difference component so that the wrong vector will be obtained. By evaluating the color difference component as well as the luminance component, the optimal vector can be obtained in such a case.

As described above, by applying the color difference signal as well as the luminance signal to the evaluation value of the motion compensating estimation, it is possible to enhance the reproducibility of the color motion which can not be evaluated on the basis of only the luminance signal.

Incidentally, while not described here, by carrying out the weighting addition in the addition of the luminance evaluation value and the color difference evaluation value in the adder 238, the more optimal evaluation value can be obtained.

Eighth Embodiment

Figure 8:
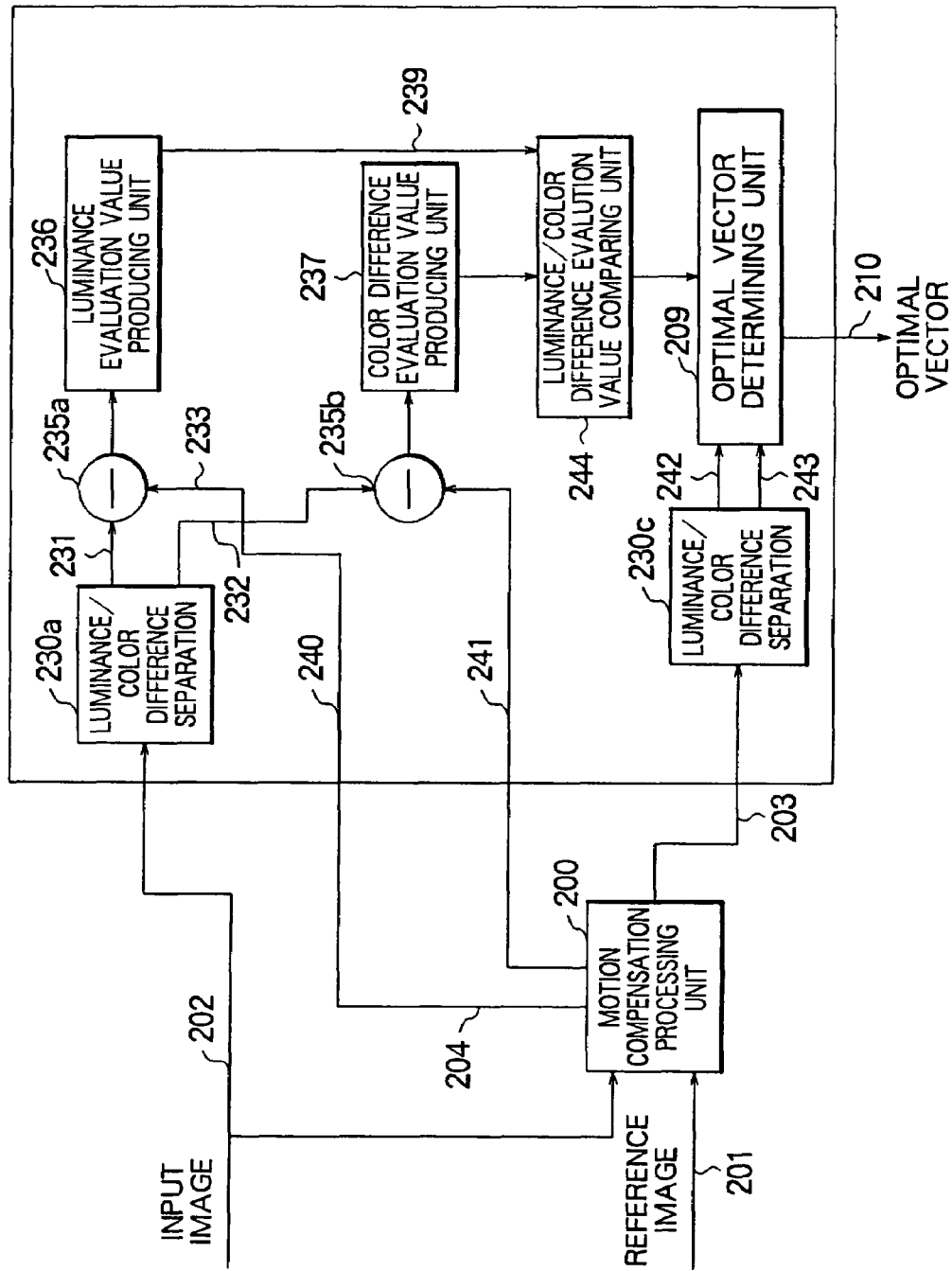
FIG. 8 is a block diagram showing a configuration of a motion compensating apparatus according to an eighth embodiment of the present invention.

FIG. 8 is a block diagram showing a configuration of a motion compensating apparatus according to an eighth embodiment of the present invention.

In FIG. 8, portions identical to those in the seventh embodiment shown in FIG. 7 are denoted by the same reference numerals, and the description thereof is omitted here for the sake of simplicity. As for new reference numerals, reference numeral 230c denotes a third luminance/color difference separating unit for separating a motion vector luminance signal 242 and a motion vector color difference signal 243 from the motion vector 203, and reference numeral 244 denotes a luminance/color difference evaluation value comparing unit, as the evaluation value calculating unit, for comparing a luminance evaluation value from the luminance evaluation value producing unit 236 and a color difference evaluation value from the color difference evaluation value producing unit 237 with each other to output an evaluation value comparison difference.

The motion compensation processing unit 200 receives as inputs thereof the input image 202 and the reference image 201 to output the motion vector between the input image 202 and the reference image 201, and also for the luminance component of the input image 202, to output an estimated image luminance signal 240 which has been extracted from the reference image 201 in accordance with the motion vector luminance signal and an estimated image color difference signal 241 which has been extracted therefrom in accordance with the motion vector color difference signal.

Further, the optimal vector determining unit 209 receives as inputs thereof the motion vector luminance signal 242, the motion vector color difference signal 243 and the evaluation value comparison difference to output as the optimal vector the motion vector, in which the evaluation value comparison difference is minimum, out of a plurality of motion vectors which can be selected.

As shown in FIG. 8, for the luminance component of the input image 202, the estimated image luminance signal 240 which has been extracted from the reference image 201 in accordance with the motion vector luminance signal 242, and the estimated image color difference signal 241 which has been extracted therefrom in accordance with the motion vector color difference signal 243 are respectively obtained.

The input image 202 is separated into the luminance signal 231 and the color difference signal 232 by the luminance/color difference separating unit 230a. Then, the difference between the input image and the estimated image of the luminance signals and the difference between the input image and the estimated image of the color difference signals are respectively obtained and then the luminance evaluation value and the color difference evaluation value are respectively calculated to be inputted to the luminance/color difference evaluation value comparing unit 244.

The comparing unit 244 carries out the weighted comparison to output the evaluation value which is judged to be more suitable to the optimal vector determining unit 209. Then, the optimal vector determining unit 209 receives as inputs thereof the luminance vector and the color difference vector and then outputs as the optimal vector 210 the selected one of the luminance vector and the color difference vector thus inputted thereto on the basis of the evaluation value which has formerly been inputted thereto.

Ninth Embodiment

Figure 9:
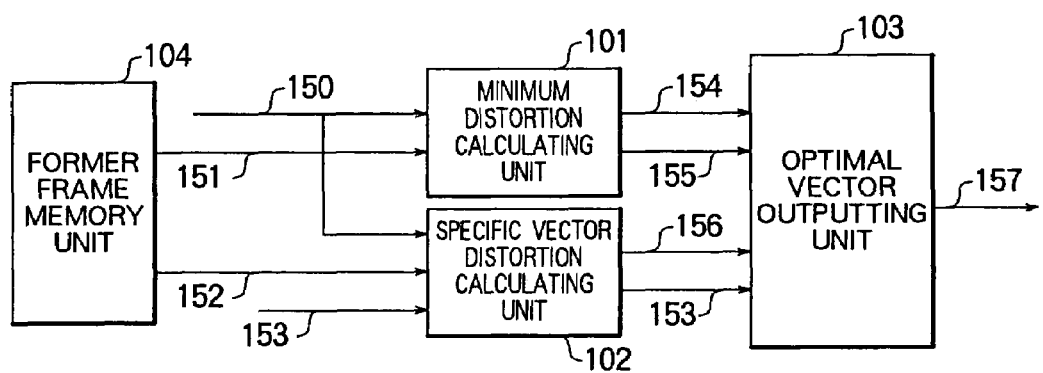
FIG. 9 is a block diagram showing a configuration of a motion compensating apparatus according to a ninth embodiment of the present invention.

FIG. 9 is a block diagram showing a configuration of a motion compensating apparatus according to a ninth embodiment of the present invention.

A motion compensating apparatus shown in FIG. 9 is a motion compensating apparatus for estimating, when carrying out the moving image coding, the motion on the basis of the data of the former frames for every block to reduce the information amount, the apparatus including: a former frame memory unit 104 for storing therein the data of the former frames; a minimum distortion calculating unit 101 for carrying out the pattern matching between the specific regions of block data 150 of a current frame and search range data 151 of the former frames to calculate a motion vector 155 giving a minimum distortion and a minimum distortion 154; a specific vector distortion calculating unit 102 for calculating a distortion 156 between the block data 150 of the current frame and block data 152 of the former frames corresponding to one or more specific vectors 153 inputted from the outside; and an optimal vector outputting unit 103 for outputting an optimal motion vector 157 on the basis of the distortion which is outputted from the minimum distortion calculating unit 101 and the distortion which is outputted from the specific vector distortion calculating unit 102.

Next, the description will hereinbelow be given with respect to the operation of the motion compensating apparatus with reference to FIG. 9.

The minimum distortion calculating unit 101 calculates, for the block data 150 of the current frame, the minimum distortion 154 and the motion vector 155 giving the minimum distortion on the basis of the search range data 151 of the former frames to output them.

On the other hand, the specific vector distortion calculating unit 102 fetches from the former frame memory unit 104 data 152 corresponding to the one or more specific vectors 153 inputted from the outside and then calculates the distortion 156 between the data 152 and the block data 150 of the current frame to output the distortion 156 thus calculated.

Thereafter, the optimal vector outputting unit 103 calculates the optimal vector on the basis of the minimum distortion 154 from the minimum distortion calculating unit 101 and the distortion 156 from the specific vector distortion calculating unit 102.

Figure 11:
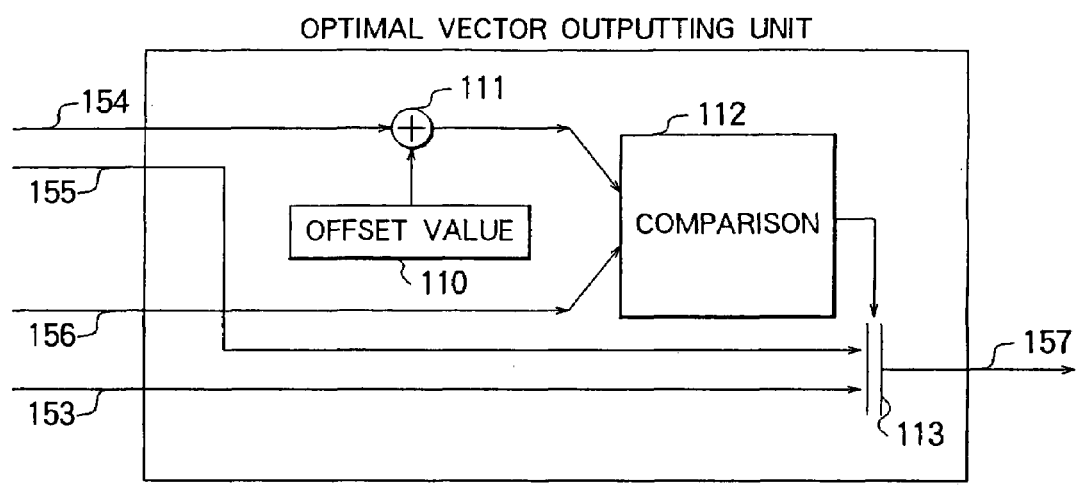
FIG. 11 is a block diagram showing a configuration of an example of another modification of a motion compensating apparatus according to a tenth embodiment of the present invention.

As for the method of calculating the optimal vector in the optimal vector outputting unit 103, there is given a method shown in FIG. 11. That is, this method is such that the offset value 110 is added to the minimum distortion 154 from the minimum distortion calculating unit 101, and the resultant value is compared with the distortion 156 from the specific vector distortion calculating unit 102 to output as the optimal motion vector 157 the motion vector giving a small value.

Figure 10:
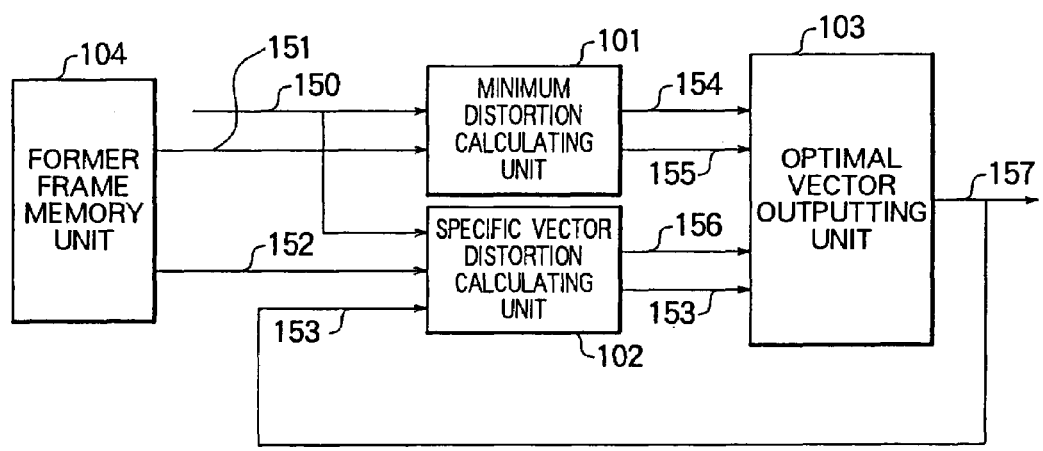
FIG. 10 is a block diagram showing a configuration of an example of a modification of a motion compensating apparatus according to a tenth embodiment of the present invention.

In addition, as shown in FIG. 10, the optimal motion vector 157 as the output of the optimal vector outputting unit 103 is inputted as the specific vector 153 of the input to the specific vector distortion calculating unit 102, whereby the optimal vector of the last block is inputted as the specific vector so that when the optimal vector of the last block is selected as the optimal vector of the current block, it is possible to realize the large reduction of the information amount in the variable-length coding of the motion vector.

Figure 12:
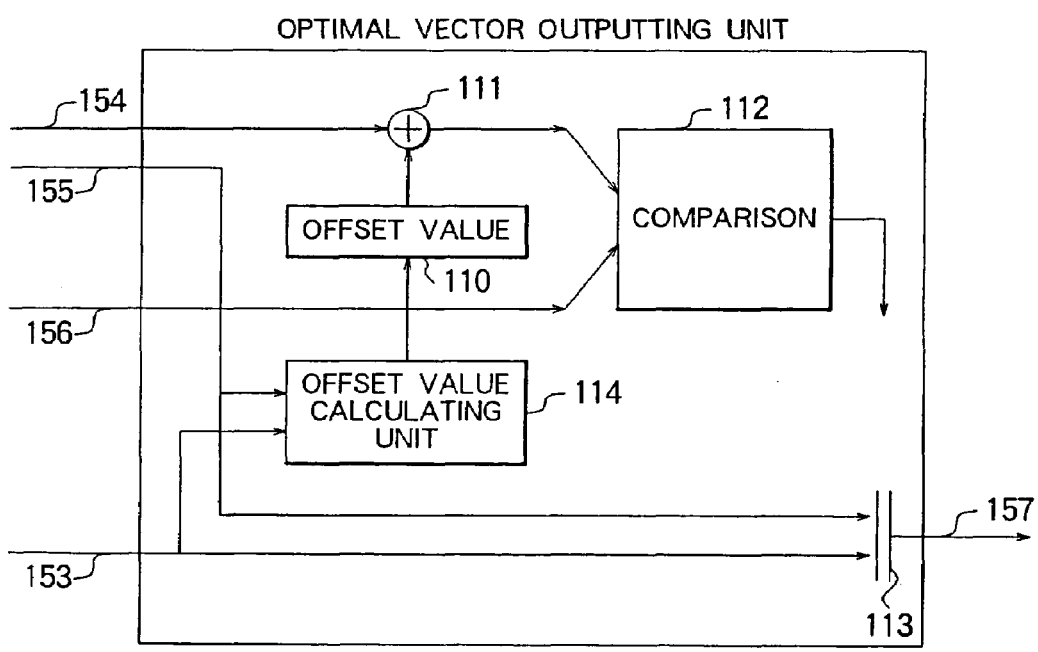
FIG. 12 is a block diagram showing a configuration of an example of still another modification of a motion compensating apparatus according to a tenth embodiment of the present invention.

In addition, as shown in FIG. 12, the optimal vector outputting unit 103 further includes an offset value calculating unit 114 for changing adaptably an offset value of the weighting to be added to the distortion from the minimum distortion calculating unit 101 in accordance with the difference between the motion vector 155 giving the minimum distortion and the specific vector 153 to supply the resultant offset value, so that the offset value may be determined in accordance with the value of the difference.

For example, when the difference between the vectors 155 and 153 is small, a small offset value is supplied, while when the difference therebetween is large, a large offset value is supplied. As a result, when the difference between the vectors is large in some degree, if the following relation is established, value of specific vector≦((minimum distortion)+offset)

then, the specific vector is selected as the optimal motion vector.

As a result, it is possible to reduce largely the amount of information which is generated during the variable-length coding.

Tenth Embodiment

Next, the following embodiment provides a moving image coding apparatus and method that can reduce the amount of codes required for coding a motion vector while suppressing the increase of total distortion, using an implementable and generally applicable, simple configuration and giving considerations to balance the total amount of codes against distortion. For this purpose, this embodiment is designed to correct a motion vector considered noncontributory to a coding distortion reduction into an estimated vector that minimizes the amount of codes. This technique is applicable to various international standard moving image coding systems as previously described in the prior art, and coincides with the aforementioned embodiments in the sense that it has the object of effectively reducing the amount of codes in a coding system as a whole.

A moving image coding apparatus according to the tenth embodiment of the present invention is an apparatus based on motion compensation estimations, and includes: a memory for storing reference image data used for a motion compensation estimation; a motion detecting unit for detecting a motion vector that gives a minimum estimated error based on an input macroblock and the reference image data from the memory; an estimated vector derivation unit for deriving an estimated vector used for coding the motion vector that is utilized for the motion compensation estimation of the input macroblock; a motion compensating unit for extracting, as estimated images corresponding to the motion vector, image data located at a position corresponding to the reference image data in the memory based on the given motion vector; a threshold processing unit for calculating an estimated error amount using the estimated image outputted from the motion compensating unit based on the motion vector obtained from the motion detecting unit, making a threshold determination on the estimated error amount using a first threshold, and not only outputting to the motion compensating unit the estimated vector obtained from the estimated vector derivation unit when the estimated error amount is greater than the first threshold but also outputting to the motion compensating unit the motion vector obtained from the motion detecting unit when the estimated error amount is smaller than the first threshold as a result of the determination; and an estimated image determining unit for generating an estimated error signal based on the estimated image corresponding to the estimated vector, making a threshold determination on an assumed value of codes generated for the estimated error signal using a second threshold, and not only outputting the motion vector obtained from the motion detecting unit as a final motion vector when the assumed value of codes generated for the estimated error signal is greater than the second threshold and outputting the estimated vector as the final motion vector when the assumed value of codes generated for the estimated error signal is smaller than the second threshold as a result of the determination, but also outputting an estimated image corresponding to the final motion vector as a final estimated image. This moving image coding apparatus implements coding that can well balance the total amount of codes against coding distortion even in low bit-rate coding in which the ratio of the amount of codes used for coding motion parameters (motion vectors) is high with respect to the amount of codes used for image data.

The tenth embodiment of the present invention will be described using an example in which technical elements of this embodiment are incorporated into a moving image coding apparatus based on general motion compensation estimation and discrete cosine transform (hereinafter referred to simply as "DCT" whenever applicable) and quantization.

Figure 13:
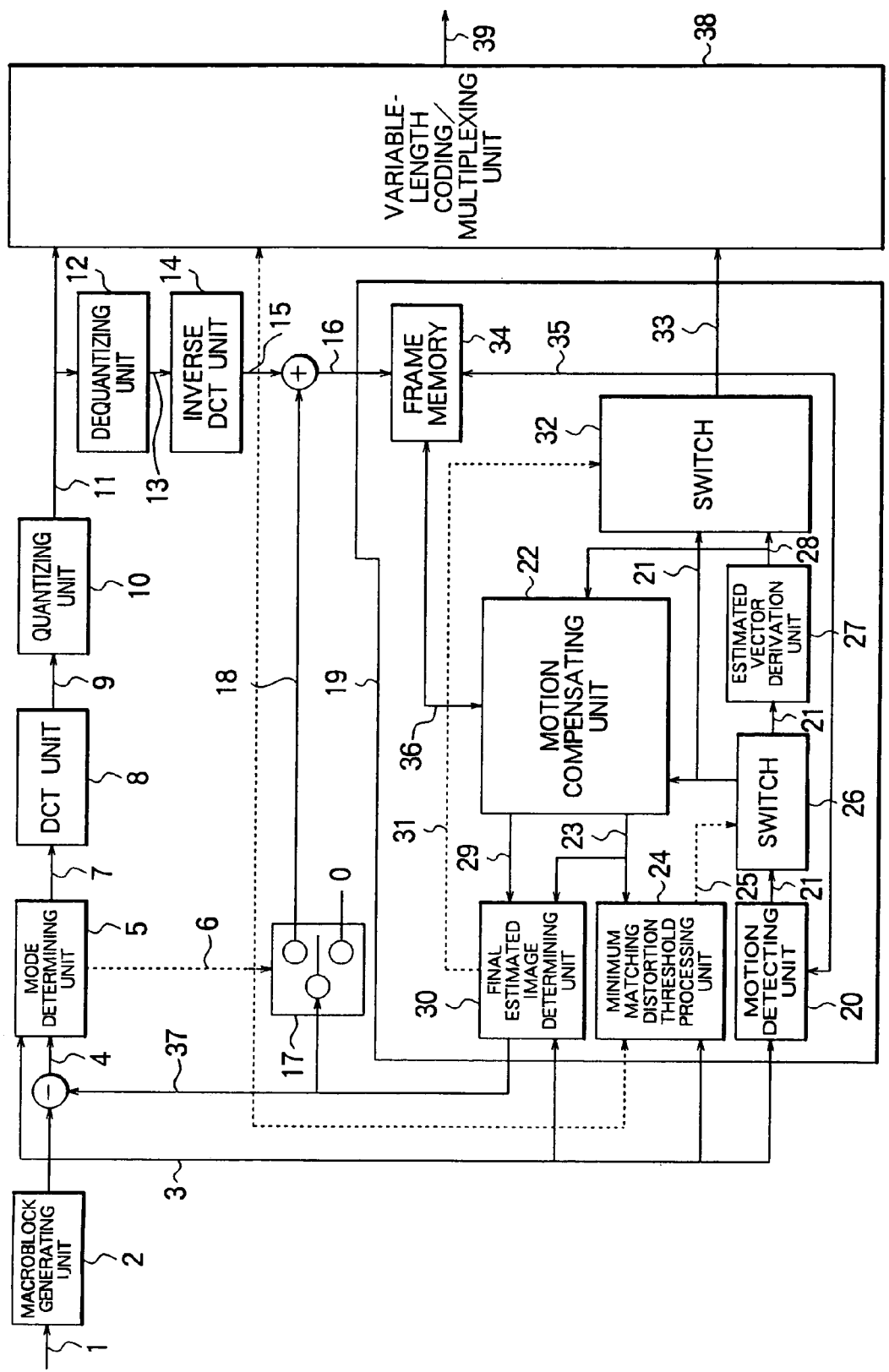
FIG. 13 is a block diagram showing a configuration of a moving image coding apparatus according to a tenth embodiment of the present invention.

FIG. 13 is a diagram showing an internal configuration of a moving image coding apparatus according to the tenth embodiment of the present invention.

The moving image coding apparatus based on motion vector-using motion compensation estimations in the tenth embodiment of the present invention shown in FIG. 13 mainly includes, within a motion compensation estimating unit 19, a frame memory 34, a motion detecting unit 20, an estimated vector derivation unit 27, a motion compensating unit 22, a minimum matching distortion threshold processing unit 24 and a final estimated image determining unit 30. The frame memory 34 stores reference image data used for a motion compensation estimation. The motion detecting unit 20 detects a motion vector 21 that gives a minimum estimated error based on an input macroblock 3 and the reference image data from the frame memory 34. The estimated vector derivation unit 27 derives an estimated vector 28 used for coding the motion vector that is utilized for the motion compensation estimation of the input macroblock 3. The motion compensating unit 22 extracts, based on a given motion vector, image data located at a position corresponding to the reference image data within the memory 34 as estimated images 23 and 29 corresponding to the motion vector. The minimum matching distortion threshold processing unit 24 calculates an estimated error amount using the estimated image 23 outputted from the motion compensating unit 22 based on the motion vector 21 obtained from the motion detecting unit 20, makes a threshold determination on the estimated error amount using a first threshold, and outputs to the motion compensating unit 22 the estimated vector 28 obtained from the estimated vector derivation unit 27 when the estimated error amount is greater than the first threshold and outputs to the motion compensating unit 22 the motion vector 21 obtained from the motion detecting unit 20 when the estimated error amount is smaller than the first threshold as a result of the determination. The estimated image determining unit 30 generates an estimated error signal based on the estimated image 29 corresponding to the estimated vector 28, makes a threshold determination on an assumed value of codes generated for the estimated error signal using a second threshold, and outputs the motion vector 21 obtained from the motion detecting unit 20 as a final motion vector 33 when the assumed value of codes generated for the estimated error signal is greater than the second threshold and outputs the estimated vector 28 as the final motion vector 33 when the assumed value of codes generated for the estimated error signal is smaller than the second threshold as a result of the determination, and further outputs an estimated image 37 corresponding to the final motion vector 33 as a final estimated image.

As for other reference numerals, reference numeral 2 denotes a macroblock generating unit for generating the input macroblock 3 based on an input video signal 1; reference numeral 5 denotes a mode determining unit for determining a mode based on two inputs, i.e., the input macroblock 3 and an estimated error signal 4, and outputting mode selection information 6 and a to-be-coded image signal 7; reference numeral 8 denotes a DCT unit for outputting DCT coefficient data 9 by subjecting the to-be-coded image signal 7 to a DCT process; reference numeral 10 denotes a quantizing unit for outputting quantized DCT coefficient data 11 by quantizing the DCT coefficient data 9; reference numeral 12 denotes a dequantizing unit for outputting dequantized DCT coefficient data 13 by dequantizing the quantized DCT coefficient data 11; reference numeral 14 denotes an inverse DCT unit for recovering decoded image data 15 based on the dequantized DCT coefficient data 13; reference numeral 16 denotes a decoded reproduced image; reference numeral 17 denotes a switch that is controlled in accordance with the mode selection information 6 from the mode determining unit 5; reference numerals 26 and 32 denote switches within the motion compensation estimating unit 19; and reference numeral 38 denotes a variable-length coding/multiplexing unit for multiplexing the quantized DCT coefficient data 11, the mode selection information 6 and the motion vector 33 in the form of a bit stream 39 by means of a predetermined syntax and variable-length coding method, and outputting the resultant bit stream.

Figure 14:
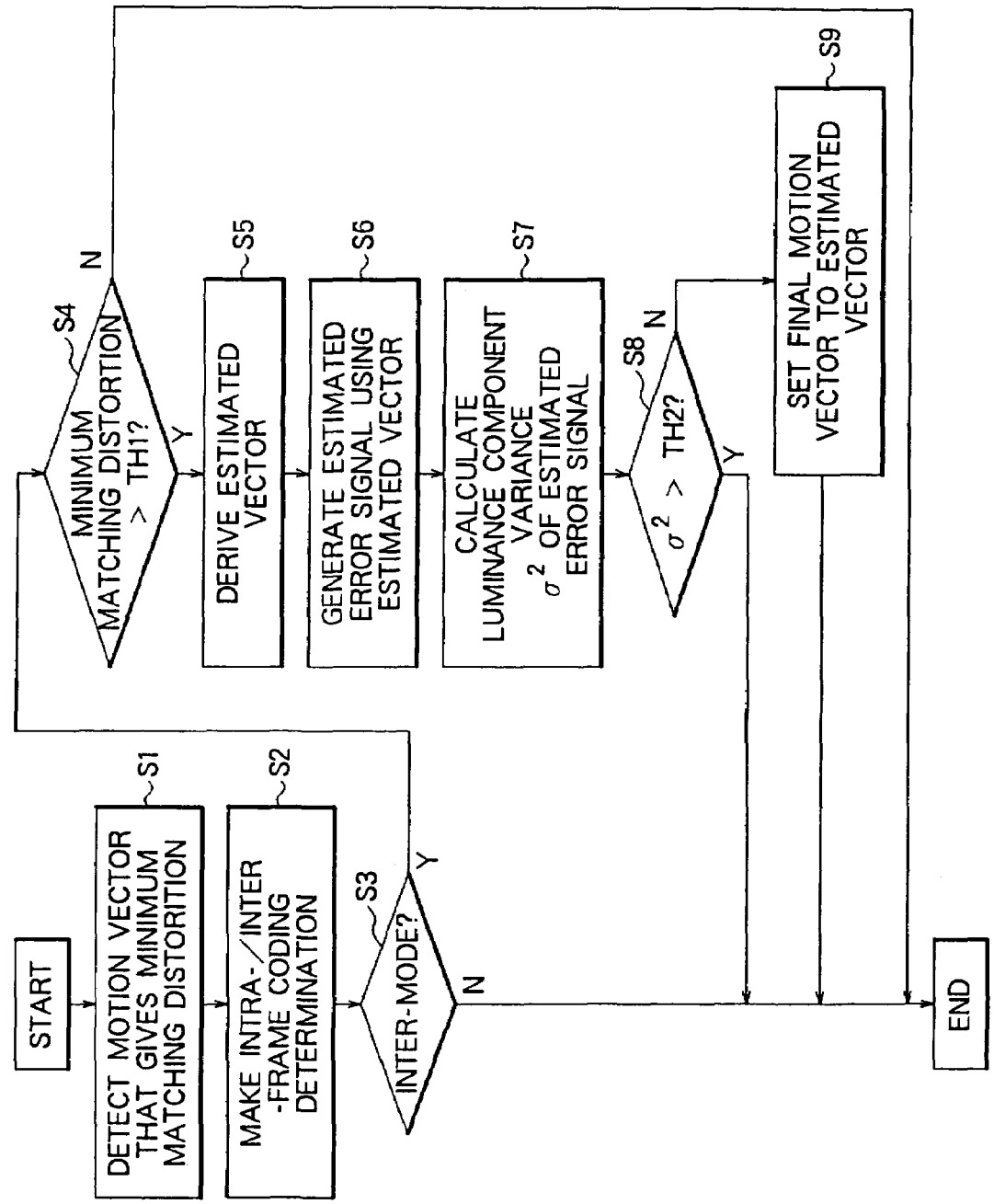
FIG. 14 is a flowchart showing a process flow of a motion compensation estimating unit 19 in the coding apparatus of FIG. 13.

Further, FIG. 14 is a flowchart showing a vector detection process including an operation of the motion compensation estimating unit 19 of FIG. 13 that explains the moving image coding apparatus and method according to the tenth embodiment of the present invention.

The following description is based on FIGS. 13 and 14.

(1) Overall Operation of Coding Apparatus

First, the overall operation of the coding apparatus shown in FIG. 13 will be described briefly. The input video signal 1 receives data corresponding to a single frame inputted thereinto, and the macroblock generating unit 2 divides the received frame data into a plurality of input macroblocks 3. The mode determining unit 5 determines whether each macroblock 3 is subjected to intra-frame coding or inter-frame coding. The input macroblock 3 and the estimated error signal 4 are used for the determination. The estimated error signal 4 is a difference signal between the input macroblock 3 and the estimated image 37 that is obtained by a process performed by the motion compensation estimating unit 19. The mode determining unit 5 selects, as a to-be-coded image signal 7, a signal that is judged to have a high coding efficiency by means of a predetermined method. While various methods are available for the determination, the determination method itself does not constitute a technical element of the present invention, and thus will not be described in detail. Further, the process performed by the motion compensation estimating unit 19 that generates the estimated image 37 and the motion vector 33 will be described in detail later.

The to-be-coded image signal 7 is subjected to a DCT process by the DCT unit 8 on a block basis so that the DCT coefficient data 9 is obtained. Each block consists of 8×8 pixels. The DCT coefficient data 9 is quantized by the quantizing unit 10 using a predetermined method, and sent to the variable-length coding/multiplexing unit 38 as the quantized DCT coefficient data 11. Further, the quantized DCT coefficient data 11 is recovered to the dequantized DCT coefficient data 13 by the dequantizing unit 12, and further recovered to the decoded image data 15 by the inverse DCT unit 14. At this point in the process, the switch 17 is controlled in accordance with the mode selection information 6 from the mode determining unit 5, so that the decoded reproduced image 16 is obtained by adding "0" in an intra-frame coding mode, or by adding the estimated image 37 in an inter-frame coding mode.

The decoded reproduced image 16 is stored in the frame memory 34 so that the image 16 will later be used for a motion compensation estimation. The motion compensation estimating unit 19 not only outputs the estimated image 37, but also outputs the motion vector 33 for obtaining the estimated image 37 to the variable-length coding/multiplexing unit 38.

The variable-length coding/multiplexing unit 38 multiplexes the quantized DCT coefficient data 11, the motion vector 33, the mode selection information 6 and the like in the form of the bit stream 39 by means of the predetermined syntax and variable-length coding method, and outputs the resultant bit stream. "The predetermined syntax" in this description means data multiplexing rules defined by the aforementioned international moving image coding standards.

(2) Operation of Motion Compensation Estimating Unit 19

The internal configuration of the motion compensation estimating unit 19 is as shown in FIG. 13. The operation of the unit 19 will be described in detail with reference to the flowchart shown in FIG. 14.

(2-1) Motion Detection Process (Step S1)

First, as shown in Step S1, the motion vector 21 that gives the input macroblock 3 a minimum estimated error (minimum matching distortion) is calculated. The motion detecting unit 20 executes this process. Though the proposed estimated errors include the sum of difference absolute values (SAD) described in the prior art and the sum of squares of differences in which the sum total of the squares of pixel differences is obtained for all the pixels constituting the luminance component of a macroblock, SAD will be used as the estimated error in the following description. The motion detecting unit 20 obtains such a position of reference image data as to minimize SAD from the input macroblock 3 and the image data included in a reference image data-given motion vector search range within the frame memory 34, and outputs a deviation from the in-frame position of the input macroblock 3 as the motion vector 21. The reference image data in the frame memory 34 that is used for calculating an estimated error is sent to the motion detecting unit 20 through an image data bus 35.

Then, the switch 26 directly passes the motion vector 21 to the motion compensating unit 22. The motion compensating unit 22 retrieves and outputs, based on the motion vector 21, the image data located at a position corresponding to the reference image data in the frame memory 34 as the estimated image 23 through an image data bus 36. The estimated image 23 is first sent to the final estimated image determining unit 30. At this point in the process, the unit 30 outputs the estimated image 23 per se as the final estimated image 37 without giving any process.

(2-2)Mode Determination (Steps S2 and S3)

Then, in Step S2, the intra-/inter-frame coding determination is made. This process is executed by the mode determining unit 5, not by the motion compensation estimating unit 19, in such a manner as described in section (1). Then, in Step S3, it is determined whether or not the mode selection information 6 specifies an "inter-mode." If the information 6 specifies an intra-mode, which is a mode in which the input macroblock 3 is directly used as a to-be-coded signal, then the process of the motion compensation estimating unit 19 is brought to an end.

(2-3) Motion Vector Efficiency Determination (Step S4)

If the mode selection information 6 specifies the inter-mode, which is a mode in which a difference image (estimated error signal) between the input macroblock 3 and the final estimated image 37 is used as a to-be-coded signal, then a motion vector that is more efficient in total terms is re-defined in accordance with the following procedure and operation, giving considerations to balance the amount of codes against coding distortion. First, in the inter-mode, the minimum matching distortion threshold processing unit 24 is activated, and a threshold determination is made on SAD based on the estimated image 23 using a preset threshold TH1 (Step S4). If TH1 is set to a value experimentally or empirically determined as improving estimation efficiency, the user can know that any SAD greater than TH1 gives an unsatisfactory efficiency to a motion compensation estimation based on the motion vector 21. That is, even if an estimated error signal is obtained using the motion vector 21 for the macroblock of interest, the user can predict to some extent that large amounts of codes are required for coding the estimated error signal. Therefore, under this condition, the user should consider reducing the amount of codes required for coding the motion vector, judging that it is not worth making a motion compensation estimation at the sacrifice of the amount of codes reserved for coding the motion vector 21 itself.

On the other hand, if SAD is smaller than TH1, the estimation efficiency of the motion vector 21 can be judged to be satisfactory, so that coding is effected by using the motion vector 21 per se as the final motion vector.

(2-4) Motion Vector Replacement Process (Steps S5 to S9)

When it is determined that SAD is greater than TH1 in Step S4, the user should consider replacing the motion vector 21 with an estimated vector that is used for actually coding the difference. In the existing standard moving image coding systems, it is common to code a motion vector by estimating the motion vector with an adjacent motion vector and using a difference between the estimated motion vector and the adjacent motion vector. Since the value of a motion vector usually resembles closely that of an adjacent motion vector, it is common to code the motion vector, allocating shorter codes to the motion vector for an estimated difference closer to zero. Therefore, the amount of codes required for coding a motion vector can be minimized by coinciding the motion vector with an estimated vector. Hence, efficient coding can be implemented with a reduced total amount of codes unless the replacement process extremely increases the amount of codes involved for coding the estimated error signal.

The minimum matching distortion threshold processing unit 24 switches the switch 26 in response to a control signal 25 upon determination that SAD is greater than TH1 in Step S4, and supplies the motion vector 21 to the estimated vector derivation unit 27. The estimated vector derivation unit 27 executes Step S5 to derive the estimated vector 28 that is used for actually coding the motion vector 21. For example, as an estimation technique, a difference is obtained using a motion vector of the last macroblock as an estimated vector (this technique is adopted in MPEG-1 and/or MPEG-2). Thus, if the motion vector 21 is set to (−2, 8) and the motion vector of the last macroblock to (0, 4), then the motion vector data to be coded is (2, 4), which is a difference between the two. "Motion vector (x, y)" in this description means that a pixel in the frame memory, which is located at a position deviated by x pixel in a horizontal direction (positive in the rightward direction) and by y pixel in a vertical direction (positive in the downward direction) from the position of a pixel in the macroblock that is to be estimated, is used as an estimated pixel. The estimated vector derivation unit 27 outputs an estimated pixel (0, 4) as a proposed vector for replacement.

The motion compensating unit 22 receives the estimated vector 28, and outputs the estimated image 29 corresponding to the estimated vector 28, following the same procedure as that for obtaining the estimated image 23.

The estimated image 29 is supplied to the final estimated image determining unit 30 together with the estimated image 23. At this point in the process, the final estimated image determining unit 30 generates an estimated error signal based on the estimated image 29 (the estimated error signal can be generated by obtaining a difference between the estimated image 29 and the input macroblock 3, this operation corresponding to Step S6), and checks the coding efficiency of the estimated error signal. The purpose of the checking is to approximately know the amount of codes required for coding the estimated error signal, since too large an amount of codes required for coding the estimated error signal will impair the advantage obtained by the replacement of the motion vector 21 with the estimated vector 28.

The checking technique is based on a threshold determination using a variance of a luminance component as an assumed value of codes generated for the estimated error signal (Steps S7 and S8). The following explains why this determination technique is employed.

The estimated error signal has, in general, a Laplace or Gaussian distribution having its peak close to zero. Coding is implemented by transforming the estimated error signal into a frequency component by means of DCT and thereby reducing redundancy while taking advantage of the fact that the coefficients of such frequency component are unevenly distributed toward low frequencies. Therefore, coding efficiency depends on how often a coefficient representing a high frequency component appears. The high frequency component content can be grasped to some extent by the variance of an estimated error signal distribution. The larger the variance is, the wider the base of the signal distribution, and thus more often the DCT coefficient representing a high frequency component appears.

From this viewpoint, the variance $^2$ of a luminance component that occupies a large amount of codes is used for the threshold determination, and if the variance is smaller than TH2, it is determined to replace the motion vector, deeming that an increase in the amount of codes required for coding the estimated error signal can be suppressed to some degree by the replacement of the motion vector (Step S9). On the other hand, if the variance of the luminance component is greater than TH2, it is determined not to replace the motion vector, judging that the replacement of the motion vector increases the amount of codes required for coding the estimated error signal. Hence, in the latter case, the motion vector 21 that gives a minimum SAD is used as the final motion vector.

The final estimated image determining unit 30 not only determines whether or not the above luminance signal variance-based replacement is made and, as a result, switches the switch 32 in response to a control signal 31 to output the final motion vector 33, but also selects the final estimated image 37 corresponding to the final motion vector 33 from the estimated images 23 or 29 and outputs the selected image. That is, in the inter-mode, not only interframe coding is effected using the final estimated image 37 that is obtained after the above process has been executed, but also the final motion vector 33 is sent to and coded by the variable-length coding/multiplexing unit 38.

The process steps in the moving image coding method based on the motion compensation estimation using the motion vector shown in FIG. 14 can be summarized as follows.

That is, the moving image coding method shown in FIG. 14 effects motion estimation coding using a motion vector by executing: the vector detection step S1 in which a motion vector that gives a minimum estimated error (minimum matching distortion) is detected based on an input macroblock and reference image data; the first threshold determination step S4 in which the estimated error signal based on the input macroblock and an estimated image corresponding to the motion vector is subjected to a threshold determination using a first threshold; the estimated vector derivation step S5 in which an estimated vector used for coding the motion vector is derived when the estimated error signal is greater than the first threshold as a result of the first threshold determination; the estimated error signal generating step S6 in which the estimated error signal based on an estimated image corresponding to the estimated vector is generated; the calculation step S7 in which an assumed value of codes generated for the estimated error signal is calculated; the second threshold defemation step S8 in which the calculated assumed value of codes generated for the estimated error signal is subjected to a threshold determination using a second threshold; and the replacement step S9 in which the motion vector is replaced with the estimated vector when the assumed value of codes generated for the estimated error signal is smaller than the second threshold as a result of the second threshold determination.

As a result of the aforementioned coding apparatus and method, coding can be implemented with the amount of codes required for coding a motion vector reduced by specifying a motion vector noncontributory to reducing the amount of codes required for coding the estimated error signal by means of threshold determinations and thus suppressing an increase in the amount of codes required for coding the estimated error signal. Hence, a motion vector that can optimize total coding efficiency for both motion information and image information can be selected.

No mention is made on a specific method of determining the thresholds TH1 and TH2 in the tenth embodiment of the present invention. Since optimization of these values TH1 and TH2 depends on a predetermined coding bit rate or frame rate, these values TH1 and TH2 can be utilized as tuning parameters to accommodate changing conditions. Coding efficiency can be improved by optimizing these values.

The coding apparatus according to the tenth embodiment of the present invention employs the following process steps in addition to the conventional motion vector search: the step of subjecting SAD to a threshold process, the step of deriving an estimated vector and an estimated error signal based on the estimated vector; and the step of calculating a variance of a luminance signal of the estimated vector-based estimated error signal and subjecting the calculated variance to a threshold process. However, the threshold processing steps for SAD and the variance can be implemented by only a single conditional branch, and the estimated vector derivation step is not a special addition since it is, at any rate, requisite for the conventional motion vector coding.

Further, an estimated vector-based estimated error signal can be generated within the process of detecting a minimum SAD-giving motion vector (executed by the motion detecting unit 20) by buffering a macroblock and temporarily storing the estimated vector. Furthermore, variance calculation requires only an extremely small amount of additional calculations since only a single variance calculation is required per macroblock (and further only for a macroblock proposed for motion vector replacement in Step S4). While some internal components must be additionally provided to implement this by hardware, only a small increase in the amount of calculations is required to construct the coding apparatus by software.

Further, while a motion vector is used as a parameter for representing an amount of motion in the tenth embodiment, the present invention is applicable to estimations based on more complicated motion parameters such as affine parameters or perspective transformation parameters. For such complicated motion parameters, parameters that can minimize redundancy in parameter coding may be obtained by the estimated vector derivation unit 27.

Eleventh Embodiment

In the aforementioned tenth embodiment, a motion vector that gives a minimum SAD may be selected from several modes. For example, several modes are available according to the MPEG-4 Final Draft (ISO/IEC JTC 1/SC29WG11/N2202) or one of the options specified in the ITU-T Recommendation H.263, which is "Advanced Prediction Mode." That is, a "1MV mode" for obtaining a single vector per macroblock and a "4MV mode" for obtaining a single motion vector per four blocks (each block consisting of 8 pixels×8 lines) can be selected as a motion vector. In this case, a mode that gives a minimum SAD can be selected by comparing the "1MV mode" with the "4MV mode."

This process can be executed within the motion detecting unit 20 shown in FIG. 13, and can be deemed as a substep for Step S1 in FIG. 14.

Further, the estimated vector derivation unit 27 in this case can be arranged to calculate an estimated vector using the median of adjacent motion vectors.

FIG. 15 shows how a motion vector is estimated based on the MPEG-4 Final Draft. In FIG. 15, "MV" is a to-be-estimated motion vector, "MV1 to MV3" are motion vectors required for calculating an estimated vector. Part (a) indicates the positions of motion vectors MV1 to MV3 for the upper left block in a macroblock; part (b) indicates the positions of motion vectors MV1 to MV3 of the upper right block in a macroblock; part (c) indicates the positions of motion vectors MV1 to MV3 of the lower left block in a macroblock; and part (d) indicates the positions of motion vectors MV1 to MV3 of the lower right block in a macroblock.

An estimated vector ($P_x$, $P_y$) can be obtained by the following equations.

$$P_x = \text{Median}(MV1_x, MV2_x, MV3_x)$$

$$P_y = \text{Median}(MV1_y, MV2_y, MV3_y)$$

where $MV1 = (MV1_x, MV1_y)$
$MV2 = (MV2_x, MV2_y)$
$MV3 = (MV3_x, MV3_y)$

Further, the function "Median bracket" outputs the median of the three arguments.

Figure 15A:
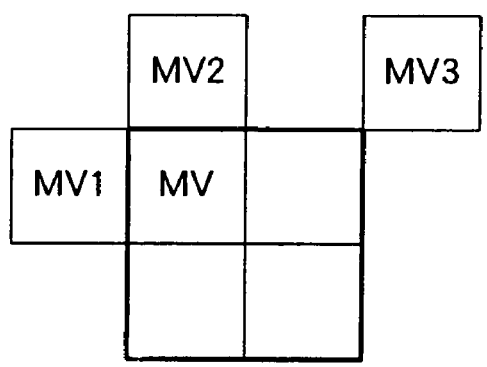
FIG. 15 is a diagram explaining a method of calculating an estimated value of a motion vector in MPEG-4 or ITU-T Recommendation H.263 according to an eleventh embodiment of the present invention.
Figure 15B:
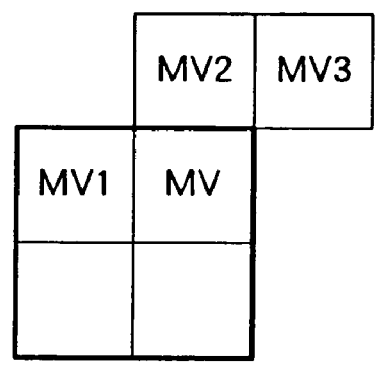
Figure 15C:
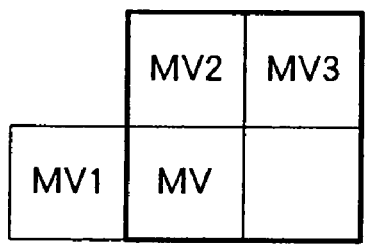
Figure 15D:
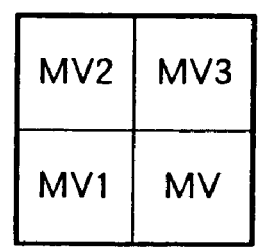

Although FIG. 15 explains the "4MV mode," the "1MV mode" can be explained by FIG. 15(a).

In case of "1MV mode," an estimated vector is obtained by using part (a) of FIG. 15 while deeming the MV as a motion vector for the entire macroblock. That is, when the motion vector mode of a macroblock to which MV1 to MV3 belong is the "1MV mode," all the four blocks are deemed as the same motion vectors.

According to the eleventh embodiment, the present invention can be utilized for coding apparatuses designed for low bit-rate coding such as MPEG-4 and H.263.

Twelfth Embodiment

In the twelfth embodiment of the present invention, a coding apparatus, which is designed to effect the on/off switching of the motion vector replacement process described with reference to the tenth embodiment on a frame basis, will be described. In a frame having an extremely high motion estimation efficiency, motion vector replacement may bring about a contrary effect in some cases. The twelfth embodiment of the present invention can provide the advantage of, e.g., preventing such contrary effect, and reducing the amount of calculations for a frame that bypasses the replacement process by effecting on/off switching on a total frame basis.

That is, in the twelfth embodiment of the present invention, a frame activity calculating unit 40 is additionally provided. The unit 40 calculates a frame activity value based on two inputs, i.e., a motion vector and a minimum estimated error amount from the motion detecting unit 20, and effects frame-based switching control of the estimated vector-using motion vector replacement process executed by the minimum matching distortion threshold processing unit 24 and the final estimated image determining unit 30 based on the calculated value. By allowing the on/off control of the motion parameter replacement process to be effected for every frame, more flexible coding with the total amount of codes well balanced against coding distortion can be implemented.

Figure 16:
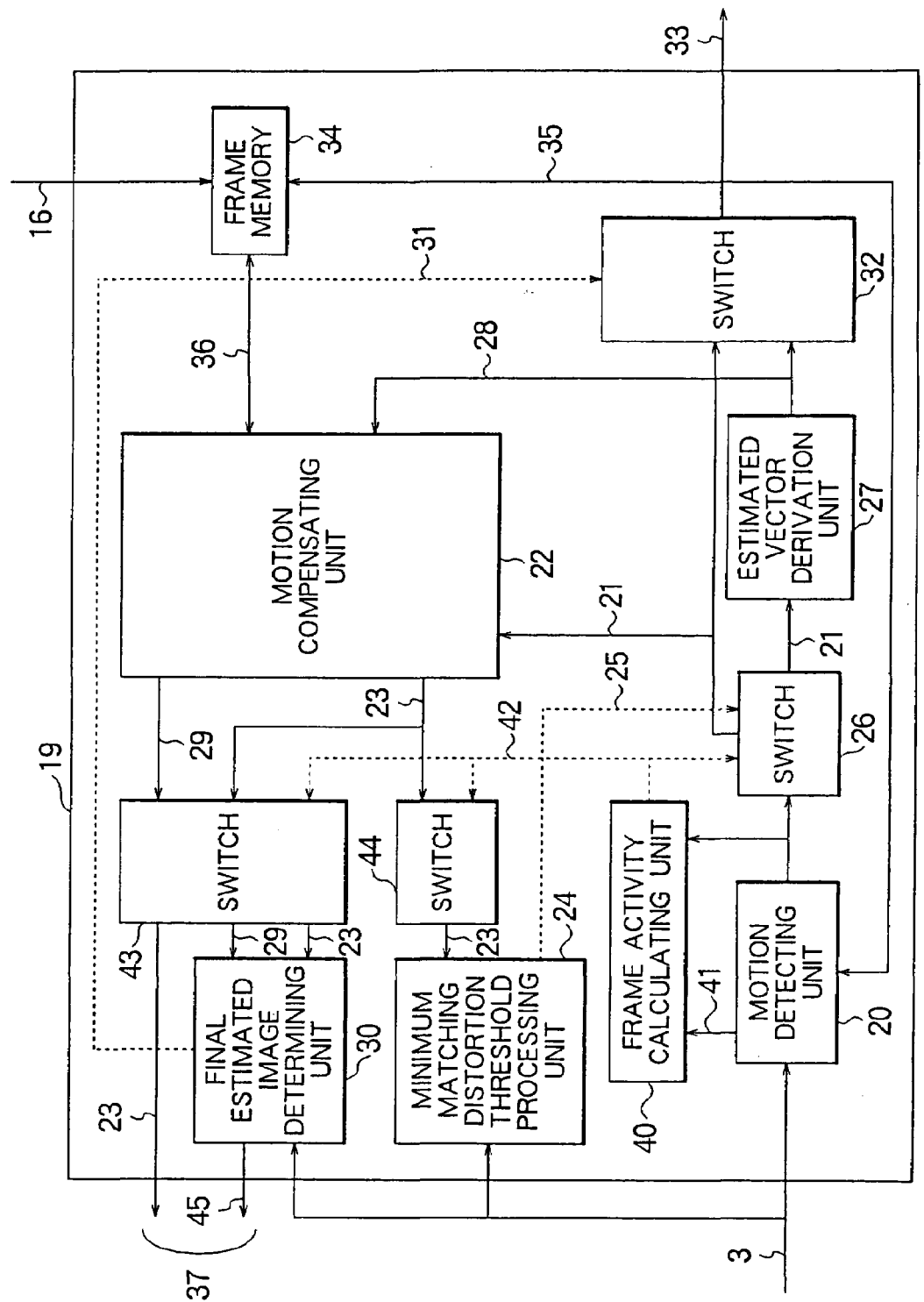
FIG. 16 is a block diagram showing a moving image coding apparatus according to a twelfth embodiment of the present invention.

FIG. 16 shows an internal configuration of the motion compensation estimating unit 19 in the twelfth embodiment of the present invention.

In FIG. 16, portions identical to those in the tenth embodiment shown in FIG. 13 are denoted by the same reference numerals, and the description thereof will be omitted. As for new portions, the twelfth embodiment of the present invention includes a frame activity calculating unit 40, and switches 43 and 44. The unit 40 calculates a frame activity value based on two inputs, i.e., the motion vector 21 and a minimum estimated error 41 from the motion detecting unit 20, and outputs a control signal 42 for effecting switching control of the estimated vector-using motion vector replacement process executed by the minimum matching distortion threshold processing unit 24 and the final estimated image determining unit 30, the switching control being effected for every frame based on the calculated value. The switches 43 and 44 execute the motion vector replacement process based on such control signal.

Figure 17:
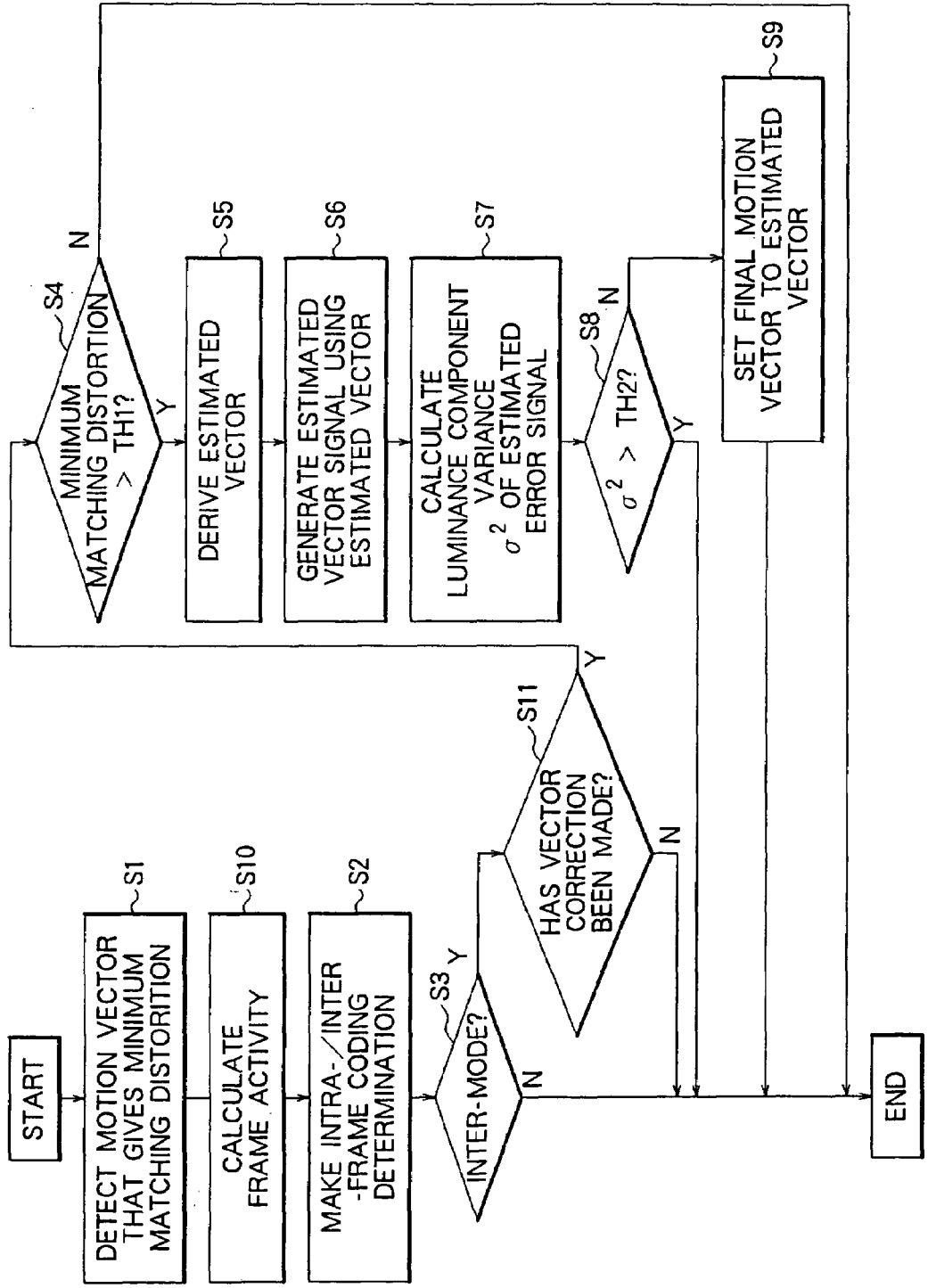
FIG. 17 is a flowchart showing a process flow of a motion compensation estimating unit 19 in the coding apparatus of FIG. 16.
Figure 18:
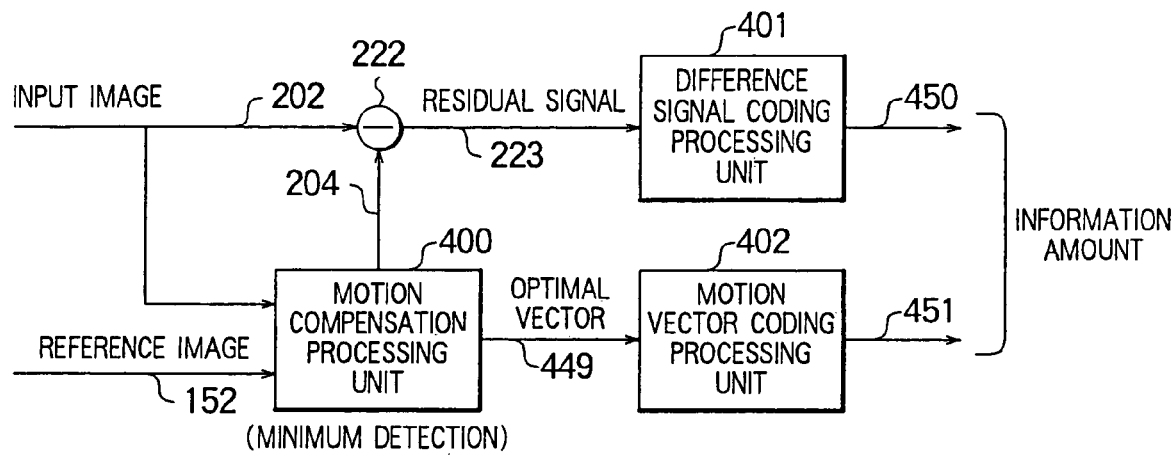
FIG. 18 is a block diagram showing a configuration of a conventional motion compensating apparatus.
Figure 19:
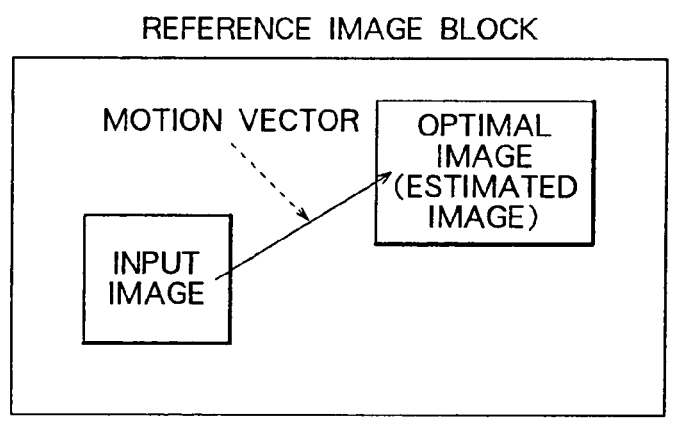
FIG. 19 is a schematic view explaining the procedure of obtaining an optimal image (estimated image).

Further, FIG. 17 is a flowchart showing a motion compensation estimation processing procedure to be taken when the motion compensation estimating unit 19 shown in FIG. 16 is used. The operation of the motion compensation estimating unit 19 in the twelfth embodiment of the present invention will be described in detail below based on FIGS. 16 and 17. The entire configuration of the coding apparatus is equivalent to that shown in FIG. 13 referred to in the tenth embodiment except that only the motion compensation estimating unit 19 is modified, and the operation of the mode determining unit 5 is also the same as that in the tenth embodiment of the present invention.

(1) Motion Detection Process (Step S1)

First, similarly to the tenth embodiment of the present invention, the motion vector 21 that gives a minimum estimated error is obtained for the input macroblock 3 as shown in Step S1. This motion vector detection process is executed for all the macroblocks in a single frame in advance, and the motion vector 21 and a minimum SAD 41 of each macroblock are then inputted to the frame activity calculating unit 40. The unit 40 calculates a frame activity (Step S10). The frame activity serves as a criterion for determining whether or not the motion vector is replaced for the frame of interest. If it is determined from the calculated frame activity to replace the motion vector, the control signal 42 causes all the switches 26, 43 and 44 to execute the process of the tenth embodiment of the present invention. Otherwise, the switches 26, 43 and 44 are operated to forcibly make a motion compensation estimation based on the minimum SAD-giving motion vector 21. These switching operations correspond to Step S11 in FIG. 17, and are performed for every macroblock in FIG. 17. While these switching operations can also be performed for every frame, the following presents an example in which selections are made for every macroblock based on frame activities.

A frame activity may be defined as the magnitude or complexity of a motion of the total frame. It can be more specifically defined as the sum of minimum SADs over the total frame or a motion vector variance indicating the degree of variation of motion vectors covering the total frame. The following controls may, e.g., be available using such frame activities. For example, if an inter-frame motion is complex, a motion vector that traces such motion through parallel displacement is not likely to give a sufficient estimation efficiency. Since it is predicted in this case that the motion vector is not functioning effectively in many areas, a motion vector replacing mechanism is set in the "ON" position. On the other hand, if a motion is monotonous and may give a sufficient estimation efficiency, the motion vector mechanism is set in the "OFF" position so that a motion vector that gives a minimum SAD can always be used. For a frame having a large sum of minimum SADs, the motion continuous from the previous frame is so complex that the motion may not be well traced. Further, when a motion vector variance is large, the complexity of the motion can be deemed to be large. At any rate, the frame activity can be defined in various ways.

Let us continue the description on the assumption that an activity that optimizes ON/OFF switching for motion vector replacement is used.

(2) Mode Determination (Steps S2 and S3)

Then, in Step S2, an intra-/inter-frame coding determination is made. This process is executed not by the motion compensation estimating unit 19, but by the mode determining unit 5 in such a manner as described in section (1) regarding the tenth embodiment of the present invention. Then, in Step S3, it is determined whether or not the mode selection information 6 specifies the "inter-mode". If the information 6 specifies the "intra-mode," in which the input macroblock 3 is directly used as a to-be-coded signal, then the process of the motion compensation estimating unit 19 is brought to an end.

(3) Frame Activity-based ON/OFF Determination for Motion Vector Replacement Process (Step S11)

As described in section (1), in Step S11, whether the procedure is continued to execute the motion vector replacement process (Steps S4 to S9) or the motion compensation estimation process is brought to an end by using the minimum SAD-giving motion vector as it is determined based on the frame activity obtained in Step S10.

(4) Motion Vector Replacement Process (Steps S4 to S9)

If it is determined to execute the motion vector replacement process in section (3), a motion vector having a satisfactory total efficiency is defined again in accordance with the procedure described with reference to the first embodiment of the present invention, giving considerations to balance the amount of codes against coding distortion. At this point in the process, the switches 43 and 44 are controlled to perform the operation described in the first embodiment of the present invention. Since this procedure is exactly the same as that described with reference to the tenth embodiment of the present invention, the description thereof will be omitted.

As described above, the moving image coding method based on motion vector-using motion compensation estimations shown in FIG. 17 implements motion estimation coding by further involving the following control step in addition to the process steps shown in FIG. 14. That is, in the control step, a frame activity is calculated based on a motion vector and a minimum estimated error amount and the switching control of whether or not a motion vector is replaced with an estimated vector is effected for every frame based on the calculated value.

As a result of the thus configured coding apparatus and method, a motion vector can be coded with a reduced amount of codes while suppressing an increase in the amount of codes required for coding an estimated error signal by specifying a motion vector noncontributory to a reduction in the amount of codes required for coding the estimated error signal through threshold determinations on a frame basis and on a macroblock basis.

Therefore, a motion vector that can optimize the total coding efficiency for the motion information and the image information can be selected flexibly. Hence, impairment of efficiency can be prevented by arranging in advance to bypass the replacement process for frames for which motion vector replacement is not an advantage.

In addition, when the replacement process is bypassed, the amount of calculations required for the replacement process can also be reduced on a frame basis.

The coding apparatus and method according to the twelfth embodiment of the present invention include more process steps than those according to the tenth embodiment. That is, the frame activity calculating step is added. However, this calculation is made only once per frame, and thus does not increase the total amount of calculations.

Further, in the twelfth embodiment of the present invention, a frame activity is calculated using both a previously coded image data in the frame memory 34 and an inputted original image. In this technique, image data containing coding distortion and an original image are used for the calculation, and thus an accurate inter-frame activity cannot be obtained. To avoid this, a frame memory that buffers an original image consisting of previous frames can be provided so that a frame activity can be calculated between the original images.

Further, the coding apparatus according to the twelfth embodiment of the present invention can be applied to low bit-rate coding apparatuses based on MPEG-4 and H.263 when the coding apparatus according to the twelfth embodiment of the present invention is rearranged to match the "1MV mode" and the "4MV mode" as described in the eleventh embodiment of the present invention.

As set forth hereinabove, according to the present invention, in order that the optimal vector may be determined, by taking as the distortion amount the coded amount of the vector coded amount as well as the sum of difference absolute values of the estimated differences into consideration, it is possible to enhance the overall coding efficiency.

In addition, by employing the sum of squares of differences instead of the sum of difference absolute values, the power contained in the difference signal can be evaluated, and hence the more accurate estimation is possible and also it is expected to enhance the coding efficiency.

In addition, by coding the differences between the motion vector of interest and the motion vectors which are previously used in the motion vector coding, it is possible to reduce the vector coded amount and hence it is expected to enhance the coding efficiency.

In addition, the motion estimation evaluation is carried out among the images which are obtained by separating the mean values from the input image and the estimated image, respectively, whereby the motion compensation can be carried out irrespective of any of levels of the image, and also even for the image which varies violently, the motion vector can be detected more accurately.

Further, the estimated difference is frequency-analyzed to obtain the frequency coefficient on the basis of which the evaluation value is in turn obtained, whereby the amount of coded information after completion of the conversion coding of the estimated error can be estimated with considerable accuracy and hence the coding can be carried out with high efficiency.

Furthermore, the estimated error is coded to obtain the amount of coded information, and also the vector coded amount is employed which is obtained after completion of the vector coding, whereby it is possible to obtain the nearly perfect coded amount in the vector of interest and also the optimal coding can be carried out in relation between the distortion and the amount of coded information.

In addition, each of the input image and the estimated image is decomposed into the luminance and the color difference to obtain the evaluation value, whereby the motion which can not be judged on the basis of only the luminance can be detected on the basis of the evaluation value of the color difference and also the motion of a color can be faithfully judged.

In addition, each of the input image and the estimated image is decomposed into the luminance and the color difference to carry out separately the estimations with respect to the luminance and the color difference to select the optimal vector among the evaluation values of the luminance and the color difference, whereby the coding can be carried out with higher efficiency.

In addition, it is possible to obtain the optimal motion vector including the variable-length coding, which is effective in enhancement of the picture quality.

Further, according to the moving image coding apparatus and method of the present invention, the amount of codes required for coding a motion vector can be reduced effectively without greatly increasing the amount of codes required for coding an estimated error signal. This advantage is particularly appreciated in low bit-rate coding in which the ratio of the amount of codes used for motion parameters is high with respect to the amount of codes used for image data, since coding can be effected with the total amount of codes well balanced against coding distortion.

Still further, switching control of whether or not the motion parameter replacement process is performed is effected for every frame based on a frame activity. Therefore, the motion parameter replacement process can be controlled on and off for every frame, and thus coding can be effected more flexibly, with the total amount of codes satisfactorily balanced against coding distortion. Furthermore, the amount of calculations can be reduced for frames for which the replacement process is completely bypassed.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A motion compensating apparatus comprising:
   motion compensation processing means for receiving as inputs thereof an input image and a reference image to output a motion vector between the input image and the reference image, and an estimated image which is extracted in accordance with the reference image;
   first luminance/color difference separating means for separating an input image luminance signal and an input image color difference signal from the input image;
   second luminance/color difference separating means for separating an estimated image luminance signal and an estimated image color difference signal from the estimated image;
   a first substracter for obtaining a difference between the input image color difference signal from said first luminance/color difference separating means and the estimated image color difference signal from said second luminance/color difference separating means;
   a second substracter for obtaining a difference between the input image luminance signal from said first luminance/color difference separating means and the estimated image luminance signal from said second luminance/color difference separating means;
   color difference evaluation value producing means for producing a color difference evaluation value on the basis of the output from said first subtracter;
   luminance evaluation value producing means for producing a luminance evaluation value on the basis of the output from said second subtracter;
   evaluation value calculating means for calculating an evaluation value for determination of an optimal vector on the basis of the color difference evaluation value from said color difference value producing means and the luminance evaluation value from said luminance evaluation value producing means; and
   vector determining means for receiving as inputs thereof the motion vector and the evaluation value for determination of an optimal vector to output as an optimal vector the motion vector, in which the evaluation value for determination of an optimal vector is minimum, out of a plurality of motion vectors which can be selected.

2. The motion compensating apparatus according to claim 1, wherein said evaluation value calculating means comprises an adder for adding the color difference evaluation value from said color difference evaluation value producing means and the luminance evaluation value from said luminance evaluation value producing means to each other to obtain a total evaluation value, and wherein said vector determining means receives as inputs thereof said motion vector and a total addition value as the total evaluation value to output as an optimal vector the motion vector, in which said total evaluation value is minimum, out of a plurality of motion vectors which can be selected.

* * * * *